United States Patent
Shih et al.

(10) Patent No.: US 9,905,895 B2
(45) Date of Patent: *Feb. 27, 2018

(54) PULSED MODE APPARATUS WITH MISMATCHED BATTERY

(71) Applicant: FRONT EDGE TECHNOLOGY, INC., Baldwin Park, CA (US)

(72) Inventors: Tung-Hsiu Shih, Ceritos, CA (US); Kai Wei Nieh, Monrovia, CA (US); Victor Krasnov, Tarzana, CA (US)

(73) Assignee: Front Edge Technology, Inc., Baldwin Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,588

(22) Filed: Aug. 31, 2015

(65) Prior Publication Data

US 2015/0372359 A1     Dec. 24, 2015

Related U.S. Application Data

(62) Division of application No. 13/626,842, filed on Sep. 25, 2012, now Pat. No. 9,159,964.

(51) Int. Cl.
*H01M 16/00* (2006.01)
*H01M 2/02* (2006.01)
(Continued)

(52) U.S. Cl.
CPC .......... *H01M 16/00* (2013.01); *H01M 2/026* (2013.01); *H01M 2/0277* (2013.01);
(Continued)

(58) Field of Classification Search
CPC .... H01M 16/00; H01M 2/0277; H01M 2/204; H01M 10/0436; H01M 10/052;
(Continued)

(56) References Cited

U.S. PATENT DOCUMENTS 3,375,135 A    3/1968 Moulton et al.
3,393,508 A    7/1968 Ray
(Continued)

FOREIGN PATENT DOCUMENTS

CN    1661354 A    8/2005
CN    1665354      8/2005
(Continued)

OTHER PUBLICATIONS

Iwata (JP, 2000-294292) (a raw machine translation) (Abstract) (Oct. 20, 2000).*
(Continued)

*Primary Examiner* — Miriam Stagg
*Assistant Examiner* — Carmen Lyles-Irving
(74) *Attorney, Agent, or Firm* — Ashok K. Janah; Janah & Associates, PC

(57) ABSTRACT

A pulse mode apparatus comprises a mismatched battery electrically connected to a pulse mode device having a pulse duty cycle with a power-on time period and a power-off time period. The mismatched battery comprises a first battery cell having a first internal resistance and first charge capacity, and a second battery cell having a second internal resistance and second charge capacity, and the battery comprises at least one of the following: (1) the second internal resistance is less than the first internal resistance, and (2) the second charge capacity is less than the first charge capacity. The battery also has a pair of electrical connectors electrically coupling the first and second battery cells in parallel, a pair of terminals connected to the first or second battery cells, and a casing around the first and second battery cells with the terminals extending out of the casing.

20 Claims, 6 Drawing Sheets

(51) Int. Cl.
*H01M 2/20* (2006.01)
*H01M 10/04* (2006.01)
*H01M 10/052* (2010.01)
*H01M 10/0562* (2010.01)
*H01M 10/0585* (2010.01)
*H01M 2/00* (2006.01)
*H01M 2/10* (2006.01)

(52) U.S. Cl.
CPC ....... *H01M 2/204* (2013.01); *H01M 10/0436* (2013.01); *H01M 10/052* (2013.01); *H01M 10/0562* (2013.01); *H01M 10/0585* (2013.01); *H01M 2/00* (2013.01); *H01M 2/10* (2013.01); *Y02E 60/122* (2013.01); *Y02P 70/54* (2015.11); *Y10T 29/4911* (2015.01); *Y10T 29/49108* (2015.01)

(58) Field of Classification Search
CPC ......... H01M 10/0562; H01M 10/0585; H01M 2/026; H01M 2/00; H01M 2/10
See application file for complete search history.

(56) References Cited

U.S. PATENT DOCUMENTS

| | | |
|---|---|---|
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |
| 3,993,508 A | 11/1976 | Erlichman |
| 4,031,449 A | 6/1977 | Trombly |
| 4,119,769 A | 10/1978 | Schneider et al. |
| 4,204,036 A | 5/1980 | Cohen et al. |
| 4,233,371 A | 11/1980 | Dorrestijn |
| 4,279,726 A | 7/1981 | Baird et al. |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,882,212 A | 11/1989 | SingDeo et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,250,891 A | 10/1993 | Glasgow |
| 5,253,300 A | 10/1993 | Knapp |
| 5,254,415 A | 10/1993 | Williams et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,478,456 A | 12/1995 | Humpal et al. |
| 5,490,911 A | 2/1996 | Makowiecki et al. |
| 5,498,490 A | 3/1996 | Brodd |
| 5,503,912 A | 4/1996 | Setoyama et al. |
| 5,506,858 A | 4/1996 | Takenaka et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates et al. |
| 5,629,560 A | 5/1997 | Katsui et al. |
| 5,650,243 A | 7/1997 | Ferment et al. |
| 5,656,364 A | 8/1997 | Rickerby et al. |
| 5,663,183 A | 9/1997 | Frost et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,707,715 A | 1/1998 | deRochemont et al. |
| 5,708,297 A | 1/1998 | Clayton |
| 5,725,909 A | 3/1998 | Shaw et al. |
| 5,786,582 A | 7/1998 | Roustaei et al. |
| 5,814,159 A | 9/1998 | Paley et al. |
| 5,818,199 A | 10/1998 | Beard |
| 5,824,374 A | 10/1998 | Bradley, Jr. et al. |
| 5,871,865 A | 2/1999 | Barker et al. |
| 5,894,656 A | 4/1999 | Menon et al. |
| 5,932,368 A | 8/1999 | Batawi et al. |
| 5,961,672 A | 10/1999 | Skotheim et al. |
| 5,981,102 A | 11/1999 | Grigg et al. |
| 5,985,485 A | 11/1999 | Ovshinsky et al. |
| 6,017,654 A | 1/2000 | Kumta et al. |
| 6,022,640 A | 2/2000 | Takada et al. |
| 6,039,850 A | 3/2000 | Schulz |
| 6,040,680 A | 3/2000 | Toya et al. |
| 6,046,575 A | 4/2000 | Demuro |
| 6,051,114 A | 4/2000 | Yao et al. |
| 6,118,248 A | 9/2000 | Gartstein et al. |
| 6,146,715 A | 11/2000 | Kim et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,220,765 B1 | 4/2001 | Tatoh |
| 6,227,204 B1 | 5/2001 | Baumann et al. |
| 6,238,847 B1 | 5/2001 | Axtell et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,365,010 B1 | 4/2002 | Hollars |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,451,184 B1 | 9/2002 | Sone |
| 6,461,757 B1 | 10/2002 | Sasayama et al. |
| 6,472,295 B1 | 10/2002 | Morris et al. |
| 6,517,968 B2 | 2/2003 | Johnson |
| 6,558,836 B1 | 5/2003 | Whitacre et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,696,199 B2 | 2/2004 | Yoshida et al. |
| 6,700,766 B2 | 3/2004 | Sato |
| 6,713,987 B2 | 3/2004 | Krasnov et al. |
| 6,780,544 B2 | 8/2004 | Noh |
| 6,805,998 B2 | 10/2004 | Jenson et al. |
| 6,863,699 B1 | 3/2005 | Krasnov et al. |
| 6,866,901 B2 | 3/2005 | Burrows et al. |
| 6,916,679 B2 | 7/2005 | Snyder et al. |
| 6,921,464 B2 | 7/2005 | Krasnov et al. |

(56) References Cited

U.S. PATENT DOCUMENTS

| | | |
|---|---|---|
| 6,940,988 B1 | 9/2005 | Shennib et al. |
| 6,982,132 B1* | 1/2006 | Goldner ............... E06B 9/24 |
| | | 204/192.11 |
| 7,037,621 B2 | 5/2006 | Kikuchi et al. |
| 7,056,620 B2 | 6/2006 | Krasnov et al. |
| 7,122,908 B2 | 10/2006 | Jiang et al. |
| 7,131,189 B2 | 11/2006 | Jenson |
| 7,157,187 B2 | 1/2007 | Jenson |
| 7,186,479 B2 | 3/2007 | Krasnov et al. |
| 7,194,801 B2 | 3/2007 | Jenson et al. |
| 7,194,901 B2 | 3/2007 | Silverbrook et al. |
| 7,286,479 B2 | 3/2007 | Bragg |
| 7,204,862 B1 | 4/2007 | Zhang |
| 7,276,878 B2 | 10/2007 | Phillips et al. |
| 7,308,316 B2 | 12/2007 | Schommer |
| 7,359,590 B2 | 4/2008 | Hsu |
| 7,397,118 B2 | 7/2008 | Tominaga |
| 7,501,202 B2 | 3/2009 | Enomoto et al. |
| 7,510,582 B2 | 3/2009 | Krasnov et al. |
| 7,524,577 B2 | 4/2009 | Bates |
| 7,679,318 B2 | 3/2010 | Aoki et al. |
| 7,701,176 B2 | 4/2010 | Chen |
| 7,846,579 B2 | 12/2010 | Krasnov et al. |
| 7,862,627 B2 | 1/2011 | Li et al. |
| 7,862,927 B2 | 1/2011 | Krasnov et al. |
| 7,959,769 B2 | 6/2011 | Zhang et al. |
| 8,030,898 B2 | 10/2011 | Okuto |
| 8,168,322 B2 | 5/2012 | Krasnov et al. |
| 8,473,285 B2 | 6/2013 | Every et al. |
| 8,502,494 B2 | 8/2013 | Nieh et al. |
| 8,557,422 B2 | 10/2013 | Yoo et al. |
| 8,628,645 B2 | 1/2014 | Wang et al. |
| 8,679,674 B2 | 3/2014 | Krasnov et al. |
| 8,728,176 B2 | 5/2014 | Li et al. |
| 8,753,724 B2 | 6/2014 | Nieh et al. |
| 8,864,954 B2 | 10/2014 | Liang et al. |
| 8,865,340 B2 | 10/2014 | Liang et al. |
| 8,870,974 B2 | 10/2014 | Nieh et al. |
| 9,159,964 B2* | 10/2015 | Shih ............... H01M 2/0277 |
| 2001/0007335 A1 | 7/2001 | Tuttle et al. |
| 2001/0041294 A1 | 11/2001 | Chu et al. |
| 2001/0052455 A1 | 12/2001 | Hong |
| 2001/0052645 A1 | 12/2001 | Op'T Eynde et al. |
| 2002/0001746 A1 | 1/2002 | Jaenson et al. |
| 2002/0004167 A1 | 1/2002 | Jenson et al. |
| 2002/0041930 A1 | 4/2002 | Erdemir et al. |
| 2002/0071989 A1 | 6/2002 | Verma et al. |
| 2002/0100989 A1 | 8/2002 | Jiang et al. |
| 2002/0102400 A1 | 8/2002 | Gorokhovsky et al. |
| 2002/0110733 A1 | 8/2002 | Johnson |
| 2002/0156823 A1 | 10/2002 | Breitkopf et al. |
| 2003/0121142 A1 | 7/2003 | Kikuchi et al. |
| 2003/0143460 A1 | 7/2003 | Yoshida et al. |
| 2003/0148172 A1* | 8/2003 | Lascaud ............ H01M 10/0436 |
| | | 429/60 |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |
| 2004/0178057 A1 | 9/2004 | Leu et al. |
| 2005/0079411 A1 | 4/2005 | Kairawicz et al. |
| 2005/0079418 A1 | 4/2005 | Kelley et al. |
| 2005/0112461 A1 | 5/2005 | Amine et al. |
| 2005/0130032 A1 | 6/2005 | Krasnov et al. |
| 2005/0147877 A1 | 7/2005 | Tarnowski et al. |
| 2005/0156573 A1 | 7/2005 | Lin |
| 2005/0275370 A1 | 12/2005 | Kim |
| 2006/0027937 A1 | 2/2006 | Benson et al. |
| 2006/0040169 A1 | 2/2006 | Liu et al. |
| 2006/0040170 A1 | 2/2006 | Liu et al. |
| 2006/0060956 A1 | 3/2006 | Tanikella |
| 2006/0068258 A1 | 3/2006 | Kinoshita |
| 2006/0115706 A1 | 6/2006 | Maeda et al. |
| 2006/0134522 A1 | 6/2006 | Zhang et al. |
| 2006/0152196 A1 | 7/2006 | Matsumoto et al. |
| 2006/0216589 A1 | 9/2006 | Krasnov et al. |
| 2006/0226812 A1 | 10/2006 | Patino et al. |
| 2006/0267546 A1 | 11/2006 | Shen et al. |
| 2006/0278617 A1 | 12/2006 | Anantharaman et al. |
| 2006/0281002 A1 | 12/2006 | Aoki et al. |
| 2007/0000688 A1 | 1/2007 | Mobley |
| 2007/0037054 A1 | 2/2007 | Kikuchi et al. |
| 2007/0047750 A1 | 3/2007 | Sauer et al. |
| 2007/0047796 A1 | 3/2007 | Anantharaman et al. |
| 2007/0104343 A1 | 5/2007 | Bengtsson et al. |
| 2007/0104344 A1 | 5/2007 | Goldberg |
| 2007/0125638 A1 | 6/2007 | Zhang et al. |
| 2007/0141460 A1 | 6/2007 | You et al. |
| 2007/0166612 A1 | 7/2007 | Krasnov et al. |
| 2007/0172739 A1 | 7/2007 | Visco et al. |
| 2007/0200258 A1 | 8/2007 | Mahler et al. |
| 2007/0207379 A1* | 9/2007 | Hatta ............... H01M 2/0207 |
| | | 429/176 |
| 2007/0297108 A1 | 12/2007 | Collins et al. |
| 2008/0003492 A1 | 1/2008 | Bates |
| 2008/0087986 A1 | 4/2008 | Tanikella |
| 2008/0191342 A1 | 8/2008 | Otremba |
| 2008/0213664 A1 | 9/2008 | Krasnov et al. |
| 2008/0217162 A1 | 9/2008 | Delrue et al. |
| 2008/0253098 A1 | 10/2008 | Liu |
| 2008/0263855 A1 | 10/2008 | Li et al. |
| 2008/0290363 A1 | 11/2008 | Lin et al. |
| 2008/0303056 A1 | 12/2008 | Ward et al. |
| 2008/0308935 A1 | 12/2008 | Kim et al. |
| 2009/0010462 A1 | 1/2009 | Ekchian et al. |
| 2009/0017371 A1 | 1/2009 | Nakamura |
| 2009/0029500 A1 | 1/2009 | Wan |
| 2009/0039498 A1 | 2/2009 | Bayerer |
| 2009/0057136 A1 | 3/2009 | Wang et al. |
| 2009/0114429 A1 | 5/2009 | Sri-Jayantha et al. |
| 2009/0115051 A1 | 5/2009 | Leung et al. |
| 2009/0136839 A1 | 5/2009 | Kraznov et al. |
| 2009/0159433 A1 | 6/2009 | Neudecker et al. |
| 2009/0208671 A1 | 8/2009 | Nieh et al. |
| 2009/0214899 A1 | 8/2009 | Shakespeare et al. |
| 2009/0288943 A1 | 11/2009 | Kwak et al. |
| 2010/0015511 A1 | 1/2010 | Yoo et al. |
| 2010/0028767 A1 | 2/2010 | Inose et al. |
| 2010/0164437 A1* | 7/2010 | McKinley ........... H01M 10/049 |
| | | 320/145 |
| 2010/0247987 A1 | 9/2010 | Holung et al. |
| 2010/0264017 A1 | 10/2010 | Nam et al. |
| 2010/0291431 A1 | 11/2010 | Shih et al. |
| 2011/0050159 A1 | 3/2011 | Nieh et al. |
| 2011/0076550 A1 | 3/2011 | Liang et al. |
| 2011/0076567 A1 | 3/2011 | Bouillon |
| 2011/0094094 A1 | 4/2011 | Li et al. |
| 2011/0248676 A1 | 10/2011 | Kim |
| 2011/0270477 A1 | 11/2011 | Falsett et al. |
| 2012/0003520 A1 | 1/2012 | Lee et al. |
| 2012/0034502 A1 | 2/2012 | Nieh et al. |
| 2012/0080940 A1 | 2/2012 | Larsen |
| 2012/0251867 A1 | 10/2012 | Krasnov et al. |
| 2012/0268057 A1 | 10/2012 | Wu |
| 2012/0270114 A1 | 10/2012 | Reynolds et al. |
| 2013/0098532 A1 | 4/2013 | Liang et al. |
| 2013/0164607 A1 | 6/2013 | Shih |
| 2013/0260230 A1 | 10/2013 | Liang et al. |
| 2014/0087227 A1 | 3/2014 | Shih |
| 2014/0106203 A1 | 4/2014 | Shih |
| 2014/0106216 A1 | 4/2014 | Liang |
| 2014/0166471 A1 | 6/2014 | Wang et al. |

FOREIGN PATENT DOCUMENTS

| | | |
|---|---|---|
| EP | 0 829 913 A | 3/1998 |
| EP | 0 933 827 | 8/1999 |
| EP | 1 353 429 A | 10/2003 |
| EP | 1 458 037 A | 9/2004 |
| EP | 1 415 355 | 1/2009 |
| FR | 2 403 652 A | 4/1979 |
| GB | 2251119 A | 6/1992 |

(56) References Cited

FOREIGN PATENT DOCUMENTS

| | | |
|---|---|---|
| JP | 59-032023 A | 2/1984 |
| JP | 59-226472 A | 12/1984 |
| JP | 60-072168 | 4/1985 |
| JP | 61195563 A | 8/1986 |
| JP | 04-295015 | 10/1992 |
| JP | 09-259929 A | 10/1997 |
| JP | H09-293516 | 11/1997 |
| JP | 2000-294292 | 10/2000 |
| JP | 2001-044073 A | 2/2001 |
| JP | 2002-165358 | 6/2002 |
| JP | 2002-313289 | 10/2002 |
| JP | 2003-249199 A | 9/2003 |
| JP | 2009-123516 | 6/2009 |
| JP | 2009-179867 A | 8/2009 |
| KR | 10-1179726 B1 | 9/2012 |
| WO | WO 1995014311 A1 | 5/1995 |
| WO | WO 1998020184 A1 | 5/1998 |
| WO | WO 1999052589 A1 | 10/1999 |
| WO | WO 2001073873 A1 | 10/2001 |
| WO | WO 2002061828 A2 | 8/2002 |
| WO | WO 2004111659 A2 | 12/2004 |
| WO | WO 2006105188 A1 | 10/2006 |
| WO | WO 2008004851 A1 | 1/2008 |
| WO | WO 2008101254 A3 | 8/2008 |
| WO | WO 2009052683 A1 | 4/2009 |

OTHER PUBLICATIONS www.dictionary.com (definition of "current density") (Mar. 4, 2017).*
Antaya et al. "Preparation and Characterization of LiCoO2 Thin Films by Laser Ablation Deposition", J. Electrochem. Soc., vol. 140, No. 3, Mar. 1993, pp. 575-578.
Bates et al., "Preferred orientation of polycrystalline LiCoO2 films" J. of the Electrochemical Society (2000), pp. 59-70, Issue No. 147 (1).
Dudney, Nancy, J. "Thin-Film Micro-Batteries", The Electrochemical Society Interface, Fall 2008 pp. 44-48.
Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.
Roh et al., "Effects of deposition condition on the ionic conductivity . . . " Scripta Materialia, Dec. 17, 1999, pp. 43-49, vol. 42. No. 1, New York, NY.
Wagner et al., "Fabrication and Testing of thermoelectric thin film devices" 15th Int'l Conf. on Thermoelectrics, Mar. 26-29, 1996, pp. 269-273.
PCT International Search Report in Application No. PCT/US2013/055477, dated Dec. 6, 2013.
PCT Written Opinion of the Int'l Searching Authority in Application No. PCT/US2013/055477, dated Dec. 6, 2013.

* cited by examiner

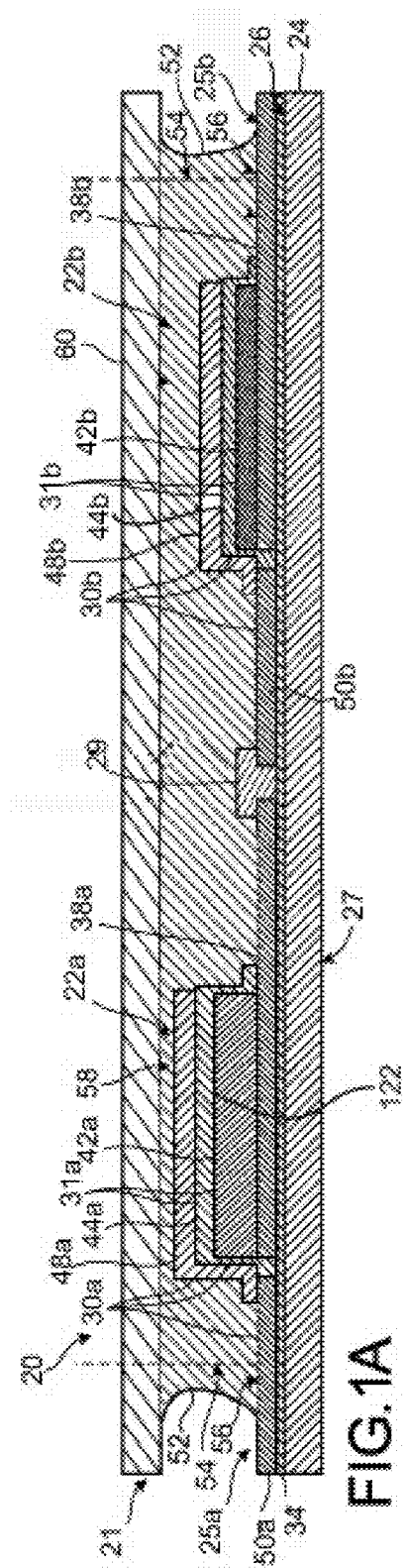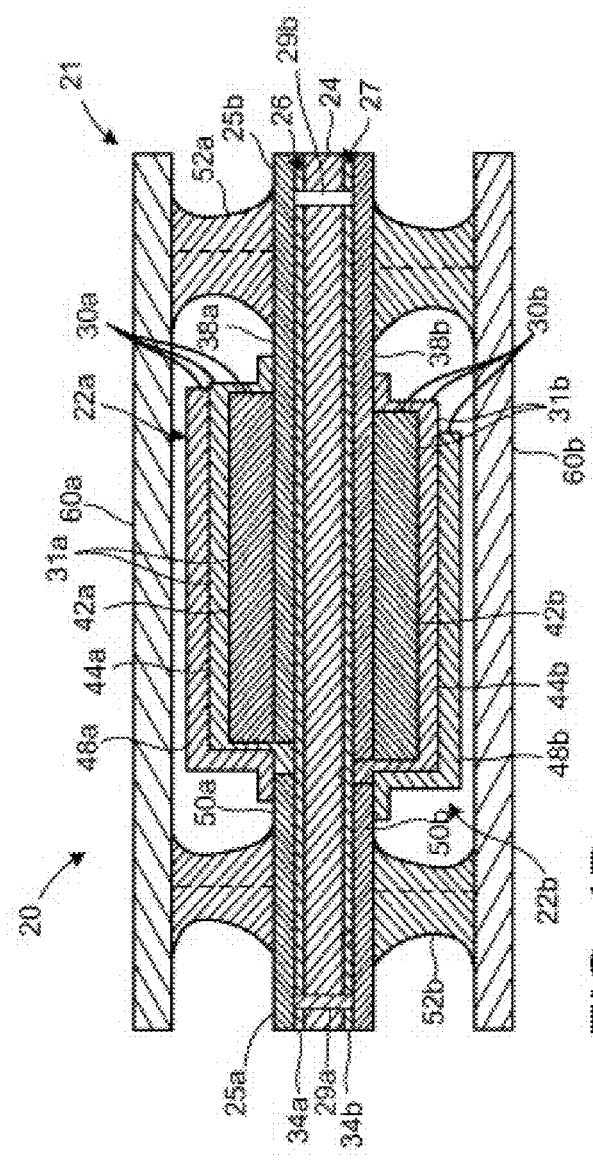

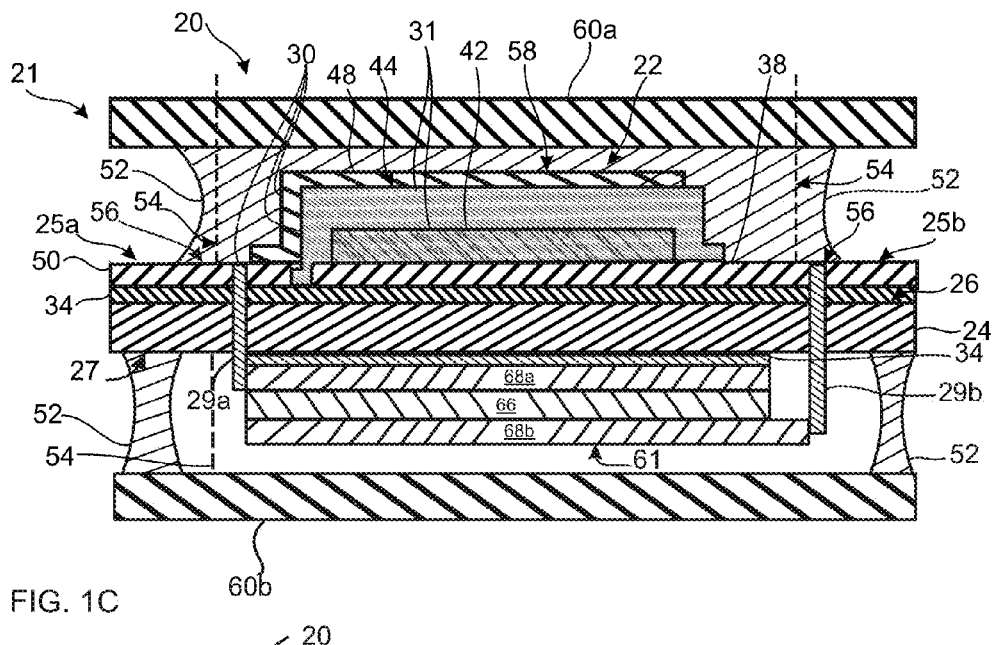
FIG. 1C
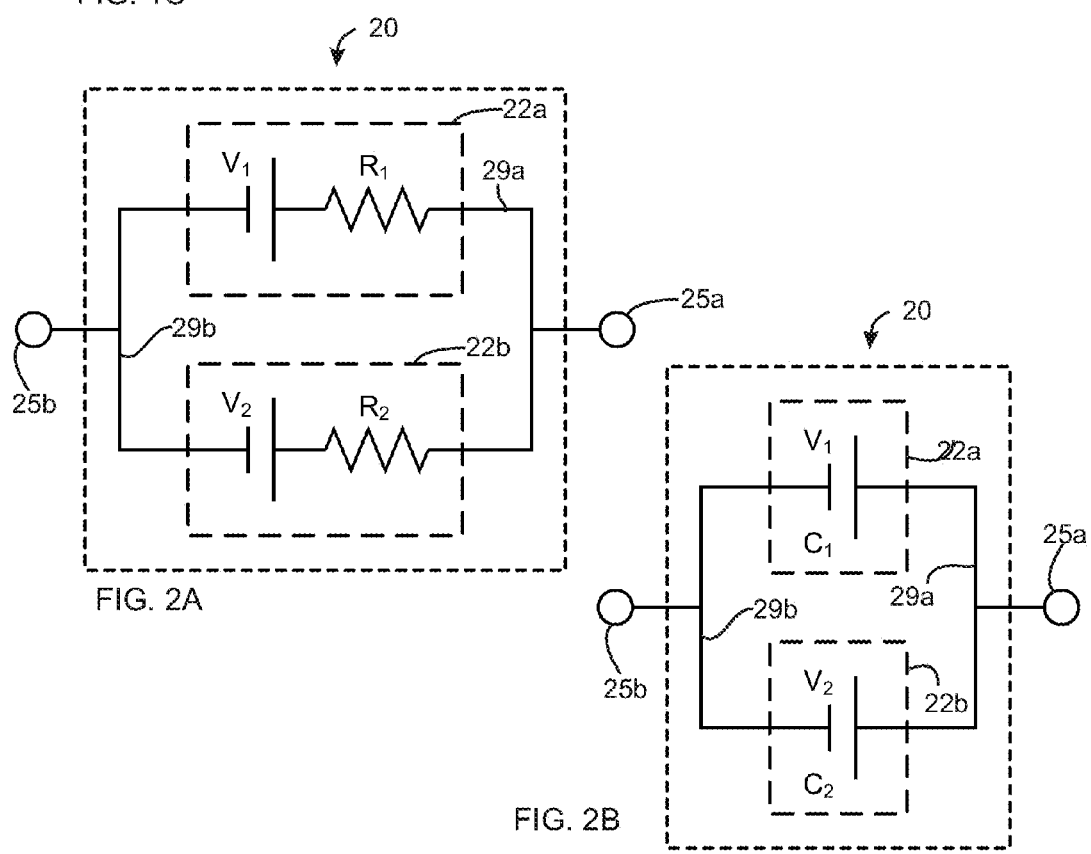
FIG. 2A
FIG. 2B

PULSED MODE APPARATUS WITH MISMATCHED BATTERY

CROSS REFERENCE

The present application is a Divisional of U.S. patent application Ser. No. 13/626,842, filed on Sep. 25, 2012, which is incorporated by reference herein and in its entirety.

BACKGROUND

Embodiments of the present invention relate to solid-state batteries and their fabrication methods.

Solid-state batteries are used in applications that require a battery with a high energy density such as, for example, portable electronics, medical devices and space systems. A typical solid-state battery comprises a support to hold one or more battery cells, each cell having a set of battery component layers that include an electrolyte sandwiched between electrode layers, such as an anode, cathode, and anode and cathode current collectors or contact pads. The battery component layers cooperate to store electrical charge and generate a voltage. Solid-state batteries include larger scale structures used for computer and car batteries, and thin film batteries in which the battery component layers are thin films which have thicknesses of less than about 100 microns. Solid-state batteries can include one or more identical battery cells which are stacked together and connected in series or in parallel to provide more power or energy.

Solid-state and thin film batteries possesses many advantages over other battery systems, such as long battery cycle life, low battery capacity fade properties, a large operational temperature range, safety, and still others. However, solid-state and thin film batteries are difficult to fabricate, and operate in, high current applications which require high current density from the battery. A typical high current application for a solid-state, thin film battery is one which requires a current density of at least about 3 mA per $cm^2$ of the active area of the solid-state or thin film battery. Solid-state, thin film batteries have limited high current applications because of the relatively low diffusion rates of the charge-carrying species which store or release electrical energy in a charged battery. The low diffusion rates occur because the charge carrying species need to diffuse through the entire thickness of the cathode to conduct current. Thus, many solid-state and thin film batteries generate current densities which are not sufficiently high for high current applications. For example, a lithium battery is a solid-state or thin film battery in which a lithium-containing material comprising lithium-containing species, such as lithium ions, is sandwiched between at least a pair of electrode layers. The lithium ions serve as the charge-carrying species of the battery cell. The lithium ion diffusion rate is generally lowest in the cathode of the battery cell because the lithium ions need to diffuse through a metal lattice, especially when the cathode is made thicker to provide battery cells having higher specific energies. These diffusion rates can limit the high output current density of the battery cell.

For these and other reasons, further developments and improvements in the structure and methods of fabricating solid-state and thin film batteries which can provide high output current density are continuously being sought.

SUMMARY

A pulse mode apparatus comprises a mismatched battery having terminals electrically connected to a pulse mode device having a pulse duty cycle with a power-on time period and a power-off time period. The mismatched battery comprises a first battery cell having a first internal resistance and first charge capacity, and a second battery cell having a second internal resistance and second charge capacity, and the battery comprises at least one of the following: (1) the second internal resistance is less than the first internal resistance, and (2) the second charge capacity is less than the first charge capacity. The battery also has a pair of electrical connectors electrically coupling the first and second battery cells in parallel, a pair of terminals connected to the first or second battery cells, and a casing around the first and second battery cells with the terminals extending out of the casing.

A method of fabricating a mismatched battery to power a pulse mode device having a pulse duty cycle with a power-on time period and a power-off time period, comprises fabricating a first battery cell having a first internal resistance and first charge capacity, and fabricating a second battery cell having a second internal resistance and second charge capacity, such that the second internal resistance is sufficiently lower than the first internal resistance or the second charge capacity is sufficiently lower than the first charge capacity, that the second battery cell is capable of electrical powering the pulse mode device for substantially the entire power-on time period, and the first battery cell is capable of recharging the second battery cell during the power-off time period. The first and second battery cells are electrically coupled in parallel, and a casing is formed around the first and second battery cells such that a pair of terminals connected to the first or second battery cells extend out of the casing.

A method of fabricating a mismatched battery to power a pulse mode device having a pulse duty cycle with a power-on time period and a power-off time period, comprises fabricating a first battery cell having a first active area and a first cathode thickness, and fabricating a second battery cell having a second active area and a second cathode thickness, such that the second active area is sufficiently different from the first active area and the second cathode thickness is sufficiently different from the first cathode thickness, that the second battery cell is capable of electrical powering the pulse mode device for substantially the entire power-on time period, and the first battery cell is capable of recharging the second battery cell during the power-off time period. The first and second battery cells are electrically coupled in parallel and a casing is formed around the first and second battery cells such that a pair of terminals connected to the first or second battery cells extend out of the casing.

A method of powering a pulse mode device having a pulse duty cycle, comprises fabricating a mismatched battery according to the methods described herein, and connecting a pulse mode device to the terminals of the mismatched battery.

DRAWINGS

These features, aspects, and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIG. 1A is a sectional side view of an embodiment of a solid-state battery comprising first and second battery cells formed on a first surface of a support and electrically connected in series;

FIG. 1B is a sectional side view of another embodiment of a solid-state battery comprising first and second battery cells formed on the first and second surfaces of a support, respectively, and which are electrically connected in parallel;

FIG. 1C is a sectional side view of another embodiment of a solid-state battery comprising a battery cell formed on a first surface of a support and a capacitor formed on the second surface of the support, the battery cell and capacitor being electrically connected in parallel;

FIG. 2A is a schematic diagram of a mismatched battery comprising first and second battery cells having different internal resistances ($R_1$, $R_2$);

FIG. 2B is a schematic diagram of a mismatched battery comprising first and second battery cells having different charge capacities ($C_1$, $C_2$);

DESCRIPTION

Figure 2C:
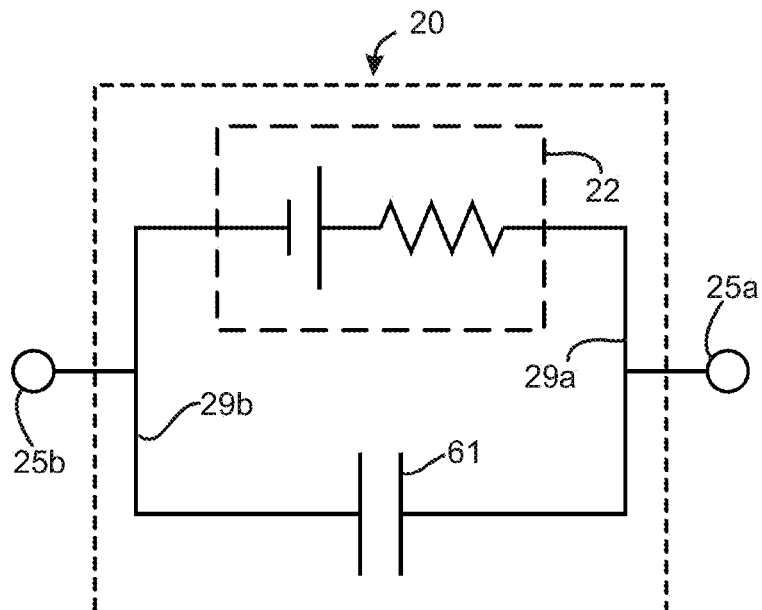
FIG. 2C is a schematic diagram of a battery comprising a battery cell connected in parallel to a capacitor.

A solid-state battery 20 comprises one or more battery cells 22a,b, as shown in FIGS. 1A and 1B, which are configured to allow the battery to perform better in particular applications, such as for example, high output current density applications, pulse mode applications, and in-frequent charging applications. Each of the battery cells 22a,b comprise a plurality of battery component layers 30a,b. The battery component layers 30a,b can include, for example, an optional adhesion layer 34; cathode current collector 38a,b; cathode 42a,b; electrolyte 44a,b; anode 48a,b; and anode contact pad 50a,b, respectively. At the minimum, the battery component layers 30a,b include an electrolyte 44a,b sandwiched between two or more electrode layers, where the electrode layers can be the cathode, anode, anode or cathode current collectors, and contact pads. The batteries 20 illustrate the structure and features of exemplary batteries; however, these exemplary battery structures should not be used to limit the scope of the claims, and alternative battery structures that would be apparent to those of ordinary skill in the art are within the scope of the present claims.

Further, while a single pair of first and second single battery cells 22a,b is illustrated in FIGS. 1A and 1B, it should be understood that more than one first battery cell 22a or second battery cell 22b can be arranged horizontally across the first surface 26 of the battery support 24, or on both the first and second surfaces 26, 27 of the support 24. The battery cells 22a,b are enclosed by a casing 21 which forms a protective shell to protect the battery cells from degradation in the external environment. In one version, the casing 21 includes a polymer 52 covering one or more of the side perimeter surfaces 54 that extend along the perimeter 56 of the battery 20, and optionally, also covers the top surface 58 of the battery cells 22a,b. The casing 21 can also include a cover 60 which is over the top surface 58 of the battery 20. Terminals 25a,b extend out of the casing 21 of the battery 20 to connect the battery 20 to an external load or circuit.

When the battery 20 is a thin film, solid-state battery, the battery component layers 30a,b can have thicknesses of less than about 100 microns, or even from about 0.1 microns to about 100 microns. Also, either or both of the battery cells 22a,b can be lithium battery cells which include lithium-containing layers 31a,b which contain lithium-containing materials having lithium-containing charge carriers such as lithium ions. The lithium-containing layers 31a,b can be composed of lithium-containing material such as elemental lithium, lithium oxides, and compound lithium oxides which are lithium oxides together with the oxides of other metals. For example, the lithium-containing layers 31a,b can be one or more of the cathode 42a,b, electrolyte 44a,b and anode 48a,b.

Referring to FIG. 1A, the battery 20 comprises at least one first battery cell 22a and at least one second battery cell 22b on a first surface 26 of a support 24. The battery cells 22a,b are connected in series by an electrical connector 29 which can be deposited on the surface 26 or on the adhesion layer 34 (as shown). For example, the electrical connector 29 can connect an cathode current collector 38a of the first battery cell 22a to an anode contact pad 50b of the second battery cell 22b in an electrical series connection which ends up at the two terminals 25a,b.

Another version of a battery 20 having first and second battery cells 22a,b which are formed on the opposing first and second surfaces 26, 27, respectively, of a support 24 is shown in FIG. 1B. Such a battery 20 can be formed using the same processes used to form the battery 20 of FIG. 1A, by flipping over the support 24 to form the battery component layers 30b of the second battery cell 22b on the second surface 27 after processing of the first battery cell 30a. Alternatively, the battery component layers 30b of the second battery cell 22b can be formed simultaneously with the battery component layers 30a of the first battery cell 22a, using a sputtering chamber having sputtering targets located on either side of the support 24. The battery cells 22a,b are electrically connected in parallel by one or more electrical connectors 29a,b which can extend through the support 24 (as shown) or around its perimeter (not shown) to connect to the two terminals 25a,b. One connector 29a connects the cathode current collectors 38a,b of the first and second battery cells 22a,b, while the other connector 29b collects the anode contact pads 50a,b of the battery cells 22a,b to form a parallel electrical connection between the two battery cells. In this battery 20, the casing 21 can include two layers or beads of polymer 52a,b adjacent to or covering the battery cells 22a,b, respectively, as well as two covers 60a,b.

Each of the battery cells 22a,b of the batteries 20 can be approximately modeled as a voltage source ($V_1$, $V_2$) in series with an internal resistance ($R_1$, $R_2$), as shown in FIG. 2A. The internal resistance $R_1$, $R_2$ can be measured by connecting the battery to a battery tester, such as an Arbin BT-2000 Battery tester, available from Arbin USA Inc., College Station, Tex., which measures the DC internal resistance of the battery. The internal resistance of a battery cell 22a,b within a battery 20, is dependent on the battery/cell size, chemical properties, age, temperature and discharge current. Thus, in the present application, the internal resistance of each battery cell, or the battery 20 itself, is determined at the time the battery cells 22a,b and battery 20 are freshly charged and relatively unused, for example, a battery 20 having undergone less than about twenty charge/discharge cycles, to prevent measuring errors of aging. Also, the internal resistance measurements are taken or modeled at a constant temperature to reduce any errors which may be caused by the measuring or modeling temperatures.

The internal resistances $R_1$, $R_2$ of the battery cells 22a,b depend upon the size, shape, and orientation of the battery component layers 30 used therein. For example, the internal resistance of a battery cell 22 can be lowered by increasing the active area 122 of the battery cell 20. The active area is the electrochemically active area across the interface between the electrolyte 44 and the cathode 42, through which charge is transported during charging or discharging of the battery 20. The internal resistance of a battery cell 22a,b can also be lowered by reducing the thickness of the electrolyte 44 between the anode 48 and the cathode 42, through which charge is transported during charging and discharging. Similarly, decreasing the active area 122, or increasing the thickness through which charge is transported, will have the effect of increasing the internal resistance of a battery cell 22.

In one version, the battery 20 comprises a mismatched cell battery having at least about two battery cells 22a,b connected in parallel with one another, the cells 22a and 22b having different internal resistances $R_1$ and $R_2$, respectively. Conventional matched batteries have matching battery cells with substantially similar internal resistances, for example, battery cells that vary in internal resistance by less than about 3%. However, in the present mismatched battery 20, the internal resistances $R_1$, $R_2$ of at least one pair of battery cells 22a,b contained in a single battery casing 21 are purposefully mismatched relative to one another to decrease the net (total) internal resistance of the battery 20 to provide a higher, maximum, battery discharge current. In other words, the first battery cell 22a has an internal resistance $R_1$ which is not equal to the internal resistance $R_2$ of the second battery cell 22b. The mismatched cell battery 20 having battery cells 22 having mismatched cell internal resistance has a reduced total internal resistance R which provides higher operational current output.

In one embodiment, the battery 20 has connected in parallel, a first battery cell 22a having a first internal resistance $R_1$, and a second battery cell 22b having a second internal resistance $R_2$ that is a predefined and different resistance than the first internal resistance $R_1$. For the battery 20 to provide a higher current output, at least one pair of the battery cells 22a,b should have different internal resistances. However, the battery 20 can comprise any one of (i) a single first battery cell 22a connected in parallel to a single second battery cell 22b, (ii) a plurality of first battery cells 22a connected in parallel to a single second battery cell 22b, or (iii) a plurality of first battery cells 22a connected in parallel to a plurality of second battery cells 22b. Further in a single battery 20, one or more electrical connectors 29a,b are used to electrically couple or connect the first and second battery cells 22a,b, respectively. A casing 21 is formed to enclose the first and second battery cells 22a,b while allowing first and second terminals 25a,b to extend out of the casing 21. The terminals 25a,b are electrically coupled to any one or both of the first and second battery cells 22a,b, and are used to output the electrical power held by the battery 20 to an external load.

The second battery cell 22b has a predefined low internal resistance $R_2$ such that the net internal resistance of the resultant multi-cell battery 20 is substantially reduced by the presence of the lower resistance second battery cell 22b. The available output voltage (V) of a battery 20 is related to the open circuit voltage ($V_0$), internal resistance (R) and discharge current (I) of the battery 20 by the formula:

$$V = V_o - I \cdot R.$$

Also, the net internal resistance R of a battery 20 having first and second battery cells 22a,b with different internal resistances $R_1$, $R_2$ that are connected in parallel to increase the active area 122 of the battery 20, is given by the formula:

$$R = R_1 R_2 / (R_1 + R_2).$$

In general, for a battery having an arbitrary number of cells, the net internal resistance R is given by the formula $$1/R = \Sigma 1/R_i$$

where $\Sigma$ denotes a sum over each of the battery cells and $R_i$ is the internal resistance of the i-th battery cell which is connected in parallel in the battery 20. For example if two battery cells 22 which have identical internal resistances are connected in parallel, the net internal resistance of the resultant battery 20 will be one half (½) the internal resistance of each battery cell 22 according to the parallel resistor formula. As a result, the maximum discharge/charge current from a two-cell battery 20 with two identical battery cells connected in parallel increases by a factor of 2. In contrast, if instead of having two identical battery cells 22, the battery 20 comprises a second battery cell 22b with a low internal resistance cell $R_2$ that is only ⅓ of the $R_1$ resistance value of the first battery cell 22a, the total internal resistance of this mismatched two-cell battery 20 will be one quarter (¼) that of the original matched cell battery 20, and the mismatched battery 20 can provide a maximum discharge current that is 4 times larger than the matched cell battery.

The mismatched cell battery 20 comprises a plurality of battery cells 22a,b with at least one second battery cell 22b having an internal resistance that is at least about 30 to about 60% less than about the internal resistance of any one or more of the first battery cells 22a. In one version, the ratio of the first internal resistance of the first battery cell 22a to the second internal resistance of the second battery cell 22b is at least 3:2 or even at least about 3:1. In this example, the product of the first internal resistance and its active area is at least about 200 $\Omega\text{-cm}^2$ and the product of the second internal resistance and its active area is less than about 150 $\Omega\text{-cm}^2$. For a cell having an active area 122 of about 1.5 $\text{cm}^2$, a ratio of at least 3:1 can provide a current output of at least about 100 mA. For example, the first internal resistance can be at least about 150 $\Omega$ and the second internal resistance can be less than about 100$\Omega$, or even less than about 50$\Omega$.

As an example, a battery 20 comprising one, low resistance, second battery cell 22b having a resistance of 50 $\Omega$ and one, high resistance, first battery cell 22a having an internal resistance of about 150Ω, which are connected in parallel, has a net internal resistance of about 37.5Ω, and this battery 20 can provide a current output of at least about 50 mA and a voltage output of at least 2V through full battery operation range with battery initial voltage of 4.2V (fully charged) to 3.6V (near fully discharged). In contrast, a matched battery comprising two identical battery cells 22 that each have the same internal resistance of about 150 Ω has a net internal resistance of about 75 Ω and a current output of less than about 25 mA even when fully charged. Thus, the mismatched internal resistance lithium battery 20 provides a current output that is twice as high as a similar sized, conventional, matched lithium battery having identical battery cells. Furthermore, the mismatched internal resistance lithium battery 20 provides at least as much output current as the matched battery even when nearly fully discharged.

The second battery cell 22b with its smaller internal resistance relative to the first battery cell 22a can be fabricated a number of different ways. For example, the internal resistance of a battery cell 22 that is a solid-state, thin film, battery cell can be primarily generated from the solid state electrolyte 44 of the battery cell 22. In such a battery cell 22, the internal resistance of the battery cell 22 is proportional to the thickness of the electrolyte 44, measured in microns, and inversely proportional to its active area 122, measured in $cm^2$. Thus the internal resistance of a battery cell 22 can be reduced by either increasing the active area 122 of the electrolyte 44, reducing the thickness of the electrolyte 44, or both.

However, the active area 122 of a single battery cell 22 is often limited by the specified or desirable battery footprint which includes the internal peripheral margin gaps maintained between various battery component layers 30, and the size of the footprint sometimes cannot be increased by a large factor. In this situation, when a larger electrolyte area is not desirable, the thickness of the electrolyte 44 can be reduced to lower the internal resistance of the battery cell 22. As an example, a thin film, solid-state lithium battery cell 22 comprising a lithium-containing electrolyte 44 such as lithium phosphorus oxynitride has a resistivity of from about 50 to about 100 ohm·$cm^2$/microns. A low resistance battery cell 22 having an internal resistance of less than about 100 Ω or even about 50 Ω can be fabricated with an active area 122 of the electrolyte 44 that is larger than about 2.25 $cm^2$, for example, about 4.53 $cm^2$; and an electrolyte thickness that is less than about 2 microns or even about 1 microns. A high resistance first battery cell 22a having an internal resistance of at least about 150 Ω or even about 200 Ω can be fabricated with an active area 122 of the electrolyte 44 that is less than about 1.5 $cm^2$ or even about 1 $cm^2$ and an increased electrolyte thickness that is at least about 3 microns or even about 4 microns.

An exemplary mismatched battery 20 comprises a low internal resistance, second battery cell 22b can be fabricated with an electrolyte 44 that is relatively thin, namely, an electrolyte 44 having a thickness that is less than about 2 microns, or even about 1 microns; while maintaining the thickness of cathode 42 in the same battery cell 22 at about 15 microns, or even about 5 microns. Such a battery cell 22 composed of lithium-containing layers would have an internal resistance that is less than about 100 Ω or even about 50Ω. However, battery cells 22b having a thinner electrolyte 44 also often result in lower yields when the thinner electrolyte does not completely cover the active area 122 of the cathode 42. Cracks and fissures in the thin electrolyte layer can arise from the volume expansion of the thick cathode 42, and because the thinner electrolyte layer 44, being is more susceptible to cracks, can cause electrical shorts and leakage currents.

In another version, the battery 20 comprises a first battery cell 22a having a first internal resistance per unit active area, and a second battery cell 22b having a second internal resistance per unit active area. As explained above, the internal resistance of a battery cell 22 can be reduced by using a smaller ratio of the thickness of the electrolyte 44 to the active area of the battery cell 22. In one version, the ratio of the first internal resistance per unit active area of the first battery cell 22a to the second internal resistance per unit active area of the second battery cell 22b is at least about 3:2. The internal resistance per unit active area is the measured or calculated internal resistance of a battery cell 22 divided by the active area of the battery cell in $cm^2$. For example, the first internal resistance per unit active area of the first battery cell 22a can be from about 200 ohm to about 300 ohm, and the second internal resistance per unit active area of the second battery cell 22b can be from about 100 ohm to about 150 ohm. The first battery cell 22a provides a first maximum current density of less than about 20 mA/$cm^2$, while the second battery cell comprises a second maximum current density which is larger than the first maximum current density, at least about 60 mA/$cm^2$. In one example, the second battery cell 22b comprises a second maximum current density of at least about 3 mA per $cm^2$ of active area.

As an example, the second battery cell 22b can be fabricated with both a thinner cathode 42 and thinner electrolyte 44 within the same cell. Thus a mismatched battery 20 can include a first battery cell 22a having a first electrolyte thickness of at least about 3 microns or even at least about 4 microns, and a first cathode thickness of at least about 15 microns or even at least about 50 microns; and a second battery cell 22b having a second electrolyte thickness of less than about 2 microns or even less than about 1 microns, and a second cathode thickness of less than about 15 microns or even less than about 5 microns. In this version, the second electrolyte thickness is less than the first electrolyte thickness and the second cathode thickness is less than the second cathode thickness. For example, the thickness of the second electrolyte can be less than the first electrolyte thickness by at least about 20%, or even at least about 30%, or even at least about 60%. Such a battery cell 22 comprising lithium-containing layers would have an internal resistance that is less than about 100Ω, or even about 50Ω. Further, the combination of the thinner cathode 42 and thinner electrolyte 44 substantially reduces microcracking and resultant leakage currents without reducing the high current density available from the mismatched cell battery 20.

In a further embodiment, the mismatched battery 20 comprises a plurality of battery cells 22 having a mismatched or different cell charge capacities, which are connected in parallel, as shown in FIG. 2B. In this battery 20, the charge capacities $C_1$, $C_2$ of any pair of first and second battery cells 22a,b contained in the battery 20 are purposefully mismatched relative to one another to provide adequate production yields while still maintaining a high battery discharge current. For example, the mismatched battery 20 comprises a plurality of battery cells 22a,b with at least one second battery cell 22b having charge capacity $C_2$ that is at least about 50% less than the charge capacity $C_1$ of a first battery cell 22a. In one version, the ratios of the charge capacities $C_1:C_2$ of the first and second battery cells 22a,b is at least about 2:1, or even at least about 3:1. For example, in one version, the first charge capacity $C_1$ is at least about 0.5 mAh, or even at least about 1 mAh; and the second charge capacity $C_2$ is less than about 0.5 mAh, or even less than about 0.25 mAh. As an example, a battery 20 comprising a single low charge capacity battery cell 22b that has a charge capacity $C_2$ of 0.25 mAh, and a single high charge capacity battery cell 22a that has a charge capacity $C_1$ of about 0.5 mAh, can generate a current output of about 50 mA. A mismatched charge capacity battery 20 comprising a lithium battery cell having one or more lithium-containing layers 31 can generate a discharge voltage to charge capacity trace that provides a better estimate of the remaining charge capacity of the battery 20. The mismatched charge capacity battery 20 can also increase production yields while using thinner electrolytes 44 that generate less internal resistance.

Thus, in a further embodiment, the mismatched charge capacity battery 20 comprises lithium battery cells with (i) at least one higher charge capacity, first battery cell 22a having a thick electrolyte 44 with a thickness of at least about 3 microns overlying a thick cathode 42 with a thickness of at least about 15 microns, and (ii) at least one lower charge capacity, second battery cell 22b having a thinner electrolyte 44 with a thickness of less than about 1 microns overlying a thinner cathode 42 with a thickness of less than about 5 microns. For example, the first battery cell 22a can have a thicker cathode 42 having a thickness of 15 microns underlying a thicker electrolyte 44 having a thickness of 3 microns whereas, the second battery cell 22b can have a thinner cathode 42 having a thickness of 5 microns underlying a thinner electrolyte 44 having a thickness of 1 microns. A battery 20 can have at least one first battery cell 22a and at least about one second battery cell 22b to generate a current output of at least about 100 mA which is twice as large as the battery with two matched first larger capacity cells.

In mismatched charge capacity battery 20, the second battery cells 22b having a thinner electrolyte 44 overlying a thinner cathode 42b exhibit far fewer microcracks and fissures. The thinner cathode 42b has a smoother surface morphology and is more easily covered uniformly by the thin electrolyte 44b, thus, generating less electronic leakage. Also, the thinner cathode 42b has an edge step having a smaller height which is more easily covered by the thin electrolyte 44b to further reduce electronic leakage at the edge step. Typically, the thinner cathode 42b has an edge step height of less than about 1 to about 5 microns. Still further, the thinner cathode 42b exhibits a smaller volume change during charge/discharge cycles to generate less mechanical stress on the overlying electrolyte 44b, which further reduces formation of microcracks. Further, in the first battery cells 22a, a thicker electrolyte 44a covers the thicker cathode 42a in a sufficiently high thickness to fully and uniformly cover the thicker cathode 42a to generate fewer electrically shorting microcracks or defects. As such, both types of battery cells 22a,b have higher production yields and the resultant battery 20 can still provide a higher current and than a battery having identical battery cells 22.

Batteries 20 having battery cells 22 connected in parallel, and having a larger mismatch in internal resistance can generate higher current output. However, other design factors besides current output are also considered in designing a battery 20. For example, the configuration of each of the plurality of first and second battery cells 22a,b within a mismatched battery 20 are selected to provide the mismatched internal resistance and charge capacity desired for a particular high output current application. Similarly, the number of mismatched battery cells 22 of each type, namely the first or second battery cells 22a,b, respectively, also depends on the voltage, current and lifetime requirements of a particular application. A particular battery design can also be dependent upon the maximum discharge current, operation temperature, and desired footprint and thickness. Thus the exemplary batteries 20 described herein should not be used to limit the scope of the present claims.

Figure 3:
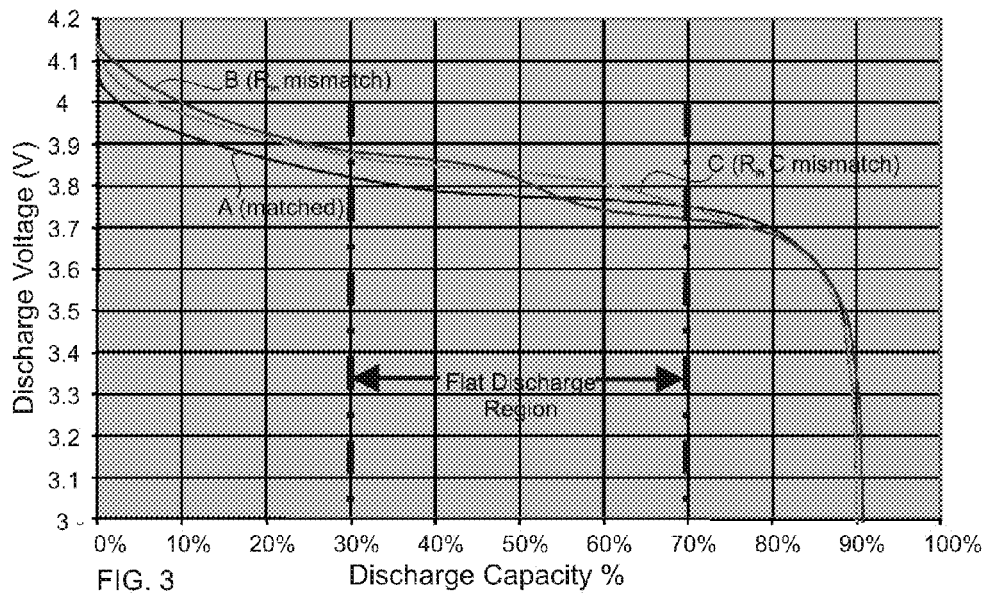
FIG. 3 is a graph of the trace of the discharge voltage versus discharge capacity for a matched battery (A), a mismatched battery (B) having battery cells with different internal resistances; and a mismatched battery (C) having battery cells with different internal resistances and charge capacities.

A discharge voltage versus discharge capacity profile for a conventional matched battery and mismatched batteries 20 was modeled in the simulation shown in FIG. 3. The graph plots the discharge voltage of the matched and mismatched batteries 20 in continuous operation mode, and also shows that the voltage-capacity profile can be applied to more accurately estimate residual charge capacity in mismatched batteries 20. Three different batteries that each had battery cells which were lithium battery cells having lithium-containing layers were used. Table I shows the configurations of the each of the three batteries, including the thicknesses of an electrolyte comprising LiPON, and a cathode comprising LiCoO, for each of the battery cells. In each battery, the first battery cell is labeled "Cell 1" and the second battery cell is labeled "Cell 2". Battery A was a matched battery with identical battery cells 22 each of which had the same thickness of the electrolyte 44 and cathode 42 providing a battery the same internal resistance and capacity for each battery cell 22. Battery B was a mismatched battery 20 having first and second battery cells 22a,b that had an internal resistance mismatch, and Battery C had first and second battery cells 22a,b which had both an internal resistance & capacity mismatch.

TABLE I

| Battery | Battery Configuration | Electrolyte thickness cell 1 (μm) | Electrolyte thickness cell 2 (μm) | Cathode thickness cell 1 (μm) | Cathode thickness cell 2 (μm) |
| --- | --- | --- | --- | --- | --- |
| A | No internal resistance & capacity mismatch | 3 | 3 | 15 | 15 |
| B | Only internal resistance mismatch | 3 | 1 | 15 | 15 |
| C | Both internal resistance & capacity mismatch | 3 | 1 | 15 | 5 |

The discharge voltage versus discharge capacity profile of FIG. 3 was measured over a time period of two hours for each of the three batteries 20. The matched battery A generated a voltage-capacity profile having a fairly flat region during which from about 30 to about 70% of the charge capacity of Battery A was discharged, and resulting in a residual capacity estimation error of 10%/10 mV of measured output battery voltage. The residual charge capacity can be estimated more accurately because of the discharge characteristics of sold state, thin film batteries 20 when their output voltage is low at near empty charge capacity. Within this flat discharge region, mismatched Battery B (mismatched internal resistance) and mismatched Battery C (both internal resistance and capacity mismatched), both exhibited a steeper slope of 2 times (B) and 4 times (C), which indicated that the accuracy of the estimate of residual charge capacity for these batteries was increased by a factor 2 and 4, respectively. Further, in the first ⅔ portion of the discharge stage, the mismatched batteries B and C both provided a higher output current as evidenced by their higher output voltage, which was a result of the presence of the lower internal resistance, second cell 22b (Cell 2). Toward the tail end of the discharge traces, the voltage values generated by all three batteries (A, B and C) overlapped with a sharp slope allowing the residual charge capacity of each of the batteries to be accurately estimated. The sharp drop in residual charge capacity occurred because at low discharge levels for time periods of one day or longer, lithium diffusion in the cathode 42 of the batteries 20 was fast enough to maintain almost the same lithium concentration throughout the entire volume of the cathode 42. This caused all three traces of the matched battery A and mismatched batteries B and C to overlap through the entire terminal portion of the discharge curve. Generally, more accurate residual charge capacity can be estimated when the flat voltage-capacity trace becomes steep with large mismatched internal resistance and capacity operated at high current.

In still another embodiment, a mismatched battery 20 capable of providing a high current density output comprises a battery assembly that includes at least one battery cell 22 connected in parallel to at least one capacitor 61 via the electrical connectors 29a,b, as shown in FIG. 2C. In the mismatched battery 20, both the battery cell 22 and the capacitor 61 are formed on the support 24, with the casing 21 enclosing both of the battery cell 22 and the capacitor 61. An exemplary cross-sectional profile of such a mismatched battery 20, as shown in FIG. 1C, comprises a battery cell 22 formed on the first surface 26 of the support 24. On the second surface 27 of the support 24, a capacitor 61 is formed. The capacitor 61 comprises a dielectric 66 sandwiched between a pair of electrodes 68a,b. For example, the dielectric 66 can be a thin insulator layer, such as a layer of glass, for example, silica glass, paper or polymer; or even air or vacuum. The electrodes 68a,b can be made by depositing a thin metal film, such as aluminum or copper below and above the dielectric 66. The metal can be deposited by conventional sputtering processes using a sputtering target composed of the desired metal. The dielectric 66 can be formed, for example, by forming a layer of silicon dioxide or silica glass on the first electrode 68a. While a single capacitor 61 is shown, it should be understood that a plurality of capacitors 61 can also be used, each of which can each have the same capacitance or different capacitances. The electrode 68a of the capacitor 61 is electrically connected by an electrical connector 29a to the anode contact pad 50 of a battery cell 22, while the electrode 68b of the capacitor 61 is electrically connected by the electrical connector 29b to the cathode current collector 38 of the battery cell 22.

The mismatched battery 20 illustrated in FIG. 10 can have one or more first battery cells 22a or second battery cells 22b, or a combination of first and second battery cells 22a,b. In one version, the mismatched battery 20 comprises one or more of a single type of battery cell 22, that is, all the battery cells 22 have the same internal resistances and charge capacities, and the capacitor 61 serves as the second battery cell with a different charge capacity and discharge characteristics to create a mismatched battery. The capacitor 61 can be a conventional capacitor 61 or a supercapacitor 61. The capacitor 61 stores less energy than a solid-state battery cell 22 thereby providing shorter high current operation and duration. However, a capacitor 61 generally has a higher leakage rate and can drain out the battery capacity when the battery 20 has not used for a long time without recharging.

A suitable capacitor 61 can have a capacitance of at least about 1 milliFarad for a mismatched battery 20 having battery cells 22 that provide a total charge capacity of at least about 0.5 mAh. For example, an exemplary lithium battery 20 comprises one or more battery cells 22 with a total charge capacity of at least 0.5 mAh, or even about 10 mAh which are connected in parallel to a capacitor 61 having a capacitance of at least about 1 milliFarad, or even about 100 milliFarad.

The battery 20 can also comprise one or more battery cells 22 connected in parallel to a capacitor 61 that is a supercapacitor, which is generally an electrochemical capacitor with relatively high energy density and is also known as a an electric double-layer capacitor (EDLC), supercondenser, electrochemical double layer capacitor or ultracapacitor. The energy density of a super capacitor 61 is typically hundreds of times greater than conventional electrolytic capacitors. For example, whereas a typical electrolytic capacitor has a capacitance of tens of milliFarads; a super capacitor having the same dimensions can have a capacitance of several Farads, which is two orders of magnitude higher. A suitable supercapacitor can have a capacitance of at least about 0.1 Farad for a battery 20 having battery cells that provide a total charge capacity of at least about 10 mAh. For example, a suitable lithium battery 20 comprises one or more battery cells 22 with a total charge capacity of at least 10 mAh, or even about 1 Ah, connected in parallel to a supercapacitor 61 having a capacitance of at least about 0.1 Farad, or even about 10 Farad.

A further advantage of having a mismatched battery 20 having battery cells 22a,b with different internal resistances or charge capacities, connected in parallel, as compared to the other battery cells 22 of the same battery 20, is that the reduction in net or total internal resistance also allows faster charging of the battery 20. For example, a battery 20 comprising two battery cells with a ratio of internal resistance of the first and second battery cells 22a,b that is at least about 3:1 can increase the initial charge current from about 50% to about 80%. As an example, a mismatched cell battery 20 comprising three low resistance, second battery cells 22b that each have an internal resistance of 50 Ω and one high resistance, first battery cell 22a having an internal resistance of about 150Ω, can be charged at least about 2.5 times faster than a conventional, matched cell battery comprising four battery cells that each have the same internal resistance of 150Ω.

Figure 2D:
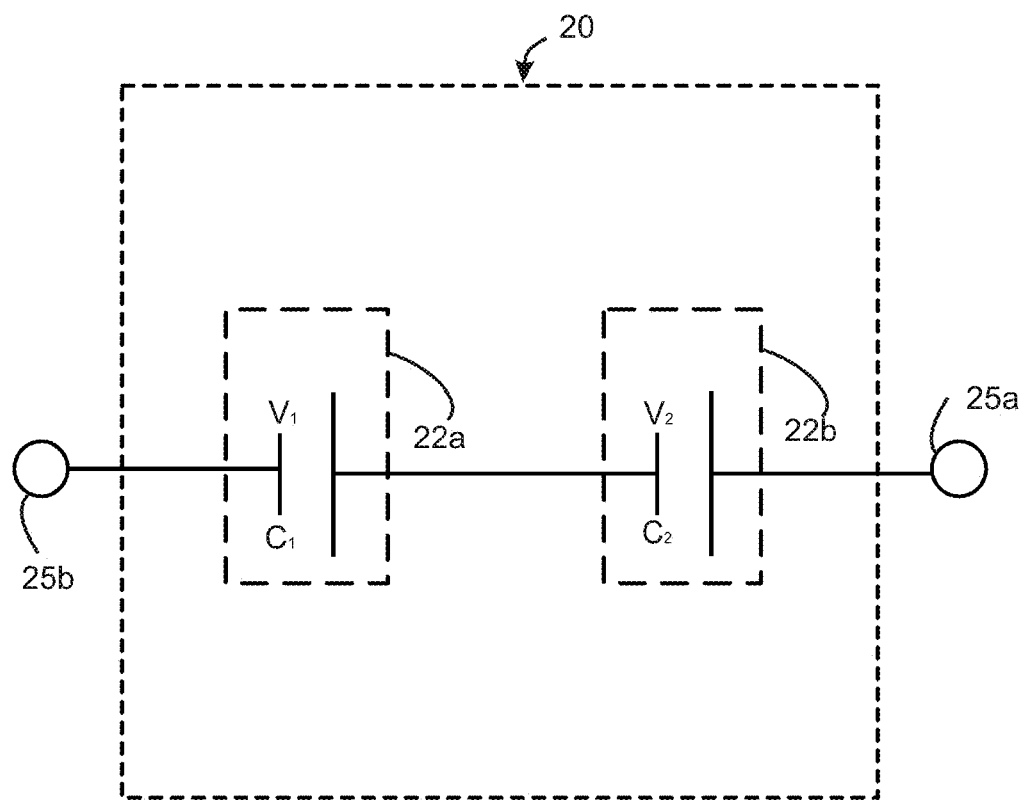
FIG. 2D is a schematic diagram of a mismatched battery comprising first and second battery cells having different charge capacities ($C_1$, $C_2$) which are connected in series.

In still another version, the mismatched battery 20 comprises first and second battery cells 22a,b having first and second charge capacities, and which are connected in series. For example, FIGS. 1A and 2D show mismatched batteries 20 that each have first and second cells 22a,b, one or more electrical connectors 29 to electrically couple the cells 22a,b in series, and a pair of terminals 25a,b which are electrically coupled to the first and second battery cells 22a,b to output electrical power to an external load. In one version, the first and second cells 22a,b each have a different chemical composition. For example, the first battery cell 22a can have a first chemical composition, and the second battery cell 22b can have a second chemical composition that is different from the first chemical composition. By chemical composition it is meant that at least one battery component layer 30 of the first battery cell 22a is a different chemical element or chemical compound then the equivalent of battery component layer 30 of the second battery cell 22b. For example, a first electrolyte 44a of the first battery cell 22a can be made of a different material than the second electrolyte 44b of the second battery cell 22b. Advantageously, the adverse effects of a battery 20 having a plurality of battery cells 22 that have large charge capacity but which can over-discharge, can be reduced by connecting in series at least one second battery cell 22b having a lower charge capacity but is more reliable and has less chance of over-discharging. For example, in a lithium battery, over-discharging can occur when an excess of amount of charge-carrying lithium ions migrate to the cathode 42 during discharge of the battery 20 causing the collapse or instability of the cathode 42. Such over-discharging can be reduced or eliminated with a mismatched battery 20 having first and second battery cells 22a,b with different chemical compositions. For example, the first battery cell 22a can be a solid state, thin film, lithium battery comprising a cathode 42 composed of $LiCoO_2$ and an electrolyte 44 composed of LiPON, and an anode 48 composed of lithium; and a second battery cell 22b comprising a cathode 42 composed of $LiCoO_2$ and an electrolyte 44 composed of LiPON, and an anode 48 composed of copper. In this example, the first and second battery cells 22a,b can be formed on a single support 24, or on different supports 24, depending on the chemical composition of the two battery cells. Also, a single casing 21 can enclose the first and second battery cells 22a,b or each battery cell 22a,b can have its own casing 21.

In yet another version, the mismatched battery 20 comprises a plurality of first battery cells 22a that each have a first charge capacity, and wherein the first charge capacities of the cells 22a are substantially similar to one another, for example the first charge capacities vary by less than 5%. The battery 20 further comprises at least one second battery cell 22b having a second charge capacity which is slightly less than the average of the first charge capacities of first battery cells 22a. In this version, the first and second battery cells 22a,b are also connected in electrical series. For example, the second battery cell 22b can have a charge capacity which is at least 10%, or even 20%, less than the average charge capacity of the first battery cells 22a, which is the sum of the first charge capacities divided by the number of first battery cells 22a. When an external load is applied to such a battery 20, the discharge process is limited or stopped by the lower charge capacity of the second battery cell 22b. Thus, while discharging of the battery 20 will stop when the lower charge capacity of the second battery cell 22b is depleted, most or all of the first battery cells 22a will still have excess charge capacity left over to prevent over-discharging of the mismatched battery 20.

For mismatched batteries 20 comprising first and second battery cells 22a,b having different charge capacities and connected in series, the first and second battery cells 22a,b can also be selected to provide an optimal mix of battery configurations or battery types. For example, the battery may comprise at least one first battery cell 22a selected to have a first operational voltage range, higher production yields, or even lower manufacturing costs. Or example, the first battery cell 22a can comprise a lithium battery cell having a cathode 42 of $LiCoO_2$, electrolyte 44 of LiPON, and anode 48 of lithium, with a first operational voltage range of from about 3.6V to about 4.2V. The same mismatched battery 20 can include a second battery cell 22b that is selected to have a lower operation voltage, lower production yields, or even higher manufacturing expensive costs. For example, the first battery cell 22a can be a lithium battery and the second battery cell 22b can be a non-lithium battery cell. In one example, the mismatched battery 20 comprises a first battery second battery cell 22b such as (i) an alkaline battery providing an output voltage of 1.5V, (ii) a nickel-cadmium battery providing an output voltage of 1.2V, (ii) a battery cell comprising can have a cathode 42, anode 48 or electrolyte 44 made from different materials than the cathode, anode or electrolyte 44, respectively, of the first battery cell 22a. The second battery cell 22b can also be selected to have different operational voltage such as for example from about 0.1 V to about 2V.

In another version of a mismatched battery 20 comprises first and second battery cells 22a,b connected in electrical series, the first battery cell 22a has a first graphical trace of discharge voltage to residual charge capacity (DV-RC trace) with a first shape, and the second battery cell 22b has a second graphical trace of discharge voltage to residual charge capacity with a second shape that is a different shape than the first shape. For example, when a battery 20 comprises one or more first battery cells 22a that each have a DV-RC trace having a slope that is a relatively flat it is difficult to estimate the depletion of charge capacity of the battery due to the small or gradual change in slope of the DV-RC trace. To remedy this defect, the mismatched battery 20 comprises a first battery cell 22a having a first trace of discharge voltage to residual charge capacity with a first slope that is less than about 0.1 V/mAh, connected in series to a second battery cell 22b having a second trace of discharge voltage to residual charge capacity with a second slope of at least about 1 V/mAh. In this example, the slope of the trace of the discharge voltage to residual charge capacity is measured between a first discharge level of 0% to a second discharge level of 90% of the DV-RC trace. In this mismatched battery 20, the second battery cell 22b serves as a gauge to more accurately monitor the residual charge capacity of the mismatched battery 20 with the flat sloped, first battery cell 22a and the steep sloped, second battery cell 22b. This is because the steeper slope of the DV-RC trace of the second battery cell 22b results in a larger drop in voltage of the mismatched battery 20 which can be more easily detected. It should be noted that since the cells 22a,b are connected in series, the voltage of the mismatched battery 20 comprises the sum of the voltage of each battery cell 22a,b.

It should be further noted, that in these examples, the number of second battery cells 22b having, for example a lower operational voltage, or any of the characteristics described above, it should be selected so that the resultant battery 20 does not have an excessively low energy density resulting from a large number of second battery cells 22b. Thus, a mismatched battery 20 of this type is generally constructed with a single or a few second battery cells 22b, or a sufficient number of second battery cells 22b to limit the capacity problem while still preventing the resultant mismatched battery 20 from over-discharging. Also when the second battery cells 22b each have a lower operational voltage bound or range, which in some cases can even be close to 0V, such as 0.1 V, a mismatched battery 20 comprising a large number of second battery cells 22b connected in series would have an excessively low output voltage bound or range for many applications.

Figure 4A:
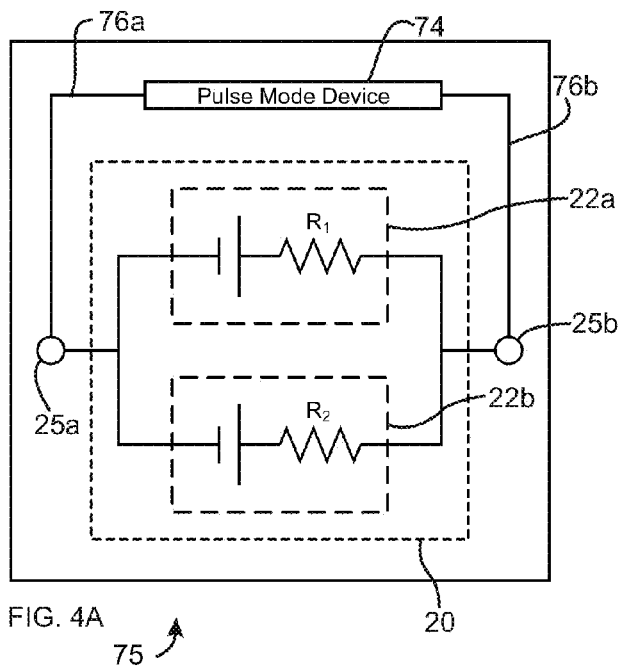
FIGS. 4A and 4B are schematic diagrams of a pulse mode apparatus comprising a pulse mode device connected to a mismatched battery having first and second battery cells, with either the second cell having a lower resistance that the first cell (FIG. 4A) or the second cell having a lower charge capacity that the first cell (FIG. 4B)
Figure 4B:
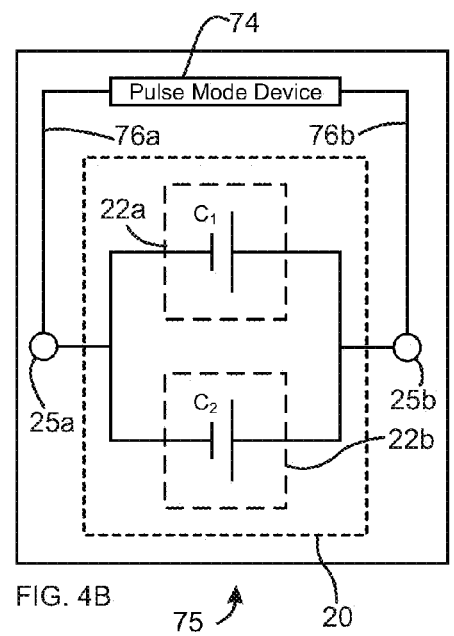

The mismatched batteries 20 are also particularly suitable for powering a pulse mode device 74 of a pulse mode apparatus 75 as shown in FIGS. 4A and 4B. The first battery cell 22a has a first internal resistance and/or first charge capacity and the second battery cell 22b has a second internal resistance and/or second charge capacity. At least one of (i) the second internal resistance is less than the first internal resistance, and (ii) the second charge capacity is less than the first charge capacity. The pulse mode device 74 is electrically connected via the pair of conductors 76a,b to the terminals 25a,b of the mismatched battery 20. The pulse mode device 74 is capable of operating in a pulse duty cycle having sequential power-on and power-off time periods. The power-on time period is the time period of the pulse duty cycle during which an external device or load is electrically connected to the mismatched battery 20 to provide an external electrical load that drains or discharges the battery 20 over time. The power-off time period is the time period of the pulse duty cycle during which the external device or load is electrically disconnected from the mismatched battery 20. As one example, a typical pulsed duty cycle has sequential power-on time periods of from about 10 milliseconds to about 1 second, and power-off time periods from about 100 milliseconds to about 100 seconds.

In FIG. 4A, a pulse mode device is connected to a mismatched battery 20 having a low resistance second battery cell 22b, and in FIG. 4B the pulse mode apparatus is connected to a mismatched battery 20 having a low charge capacity second battery cell 22b. The capacity second battery cell 22b can also have both a low internal resistance and a low charge capacity or can be substituted with a capacitor 61 (not shown). In the pulse mode apparatus 75, the mismatched battery 20 powers the pulse mode device 74 which is electrically connected via a pair of conductors 76a,b to the terminals 25a,b of the battery 20.

During pulse mode operation, the low resistance or low charge capacity second battery cell(s) 22b provides the high current needed for the power-on time period; whereas, the high internal resistance or high charge capacity first battery cell(s) 22a recharges the second battery cells 22b during the power-off time period when the pulse duty cycle of the pulse mode device is terminated. Thus, the first battery cell(s) 22a maintain the low current consumption needed to support the pulsed power application by recharging the second battery cell(s) 22b when the pulsed power is in a power-off state.

In one version, the mismatched battery 20 is designed by selecting the second internal resistance of the second battery cell 22b to have a predefined value that is lower than the first internal resistance of the first battery cell 22a by a sufficient amount to allow the second battery cell 22b to provide electrical power to the pulse mode device for substantially the entire power-on time period or power-on portion of the duty cycle, and the first battery cell 22a to substantially recharge the second battery cell 22b during the power-off time period or power off portion of the duty cycle. By substantially entire power-on time period it is meant at least about 80% or even about 90% of the power-on time period. For example, the second internal resistance can be selected to have a predefined value that is lower than the first internal resistance by at least about 30% to provide electrical power to the pulse mode apparatus for a power-on time period of from about 10 milliseconds to about 1 second, while allowing the first battery cell 22a to recharge the second battery cell 22b during the power-off time period of from about 100 milliseconds to about 100 seconds. As an example, the second internal resistance can be from about 50 Ω to about 100Ω, and the first internal resistance can be from about 150Ω to about 200Ω, to provide electrical power to the pulse mode apparatus for a power-on time period of from about 10 milliseconds to about 1 second.

In another version, the mismatched cell battery comprises a first battery cell 22a having a first active area and first cathode thickness; a second battery cell 22b having a second active area that is a different size than the first active area and a second cathode thickness that is different from the first cathode thickness. The second active area and second cathode thickness of the second battery cell 22b are selected to have predefined values that are sufficiently different from the first active area and first cathode thickness of the first battery cell 22a, respectively, to allow the second battery cell 22b to provide electrical power to the pulse mode apparatus for substantially the entire pulse-on time period, and to allow the first battery cell 22a to recharge the second battery cell 22b during the pulse-off time period. For example, the second active area of the second battery cell 22b is selected to have a predefined value that is higher than the first active area by a sufficient amount and the second cathode thickness of the second battery cell 22b is selected to have a predefined value that is lower than the first cathode thickness by a sufficient amount to allow the second battery cell 22b to provide electrical power to the pulse mode apparatus for substantially the entire pulse-on time period, and to allow the first battery cell 22a to recharge the second battery cell 22b during the pulse-off time period. For example, the second active area can be selected to have a predefined value that is higher than the first active area by at least about 30% and the second cathode thickness can be selected to have a predefined value that is lower than the first cathode thickness by at least about 30% to provide electrical power to the pulse mode apparatus for a power-on time period of from about 10 milliseconds to about 1 second, while allowing the first battery cell 22a to recharge the second battery cell 22b during the power-off time period of from about 100 milliseconds to about 100 seconds. As an example, the second active area can be from about 2 $cm^2$ to about 3 $cm^2$ and the first active area can be from about 1 $cm^2$ to about 1.5 $cm^2$, the second cathode thickness can be from about 3 microns to about 5 microns, and the first active area can be from about 10 microns to about 20 microns to provide electrical power to the pulse mode apparatus for a power-on time period of from about 10 milliseconds to about 1 second. As the second battery cell 22b having the lower mismatched active area can draw most of the current during the pulse-on time period, the first battery cell 22a has a higher cathode thickness to be able to recharge the second battery cell 22b during the pulse-off time period.

In many pulsed mode applications, the pulse duty for each duty cycle is typically low because the power-on time periods are relatively short compared to the power-off time periods. Further, the average discharge current is also low in many pulse duty cycle applications. So the first and second battery cells 22a,b can be selected to provide full charge output during the power-on time periods and recharging during the power-off time periods. Still further, a solid-state mismatched battery 20 comprising lithium-containing layers with lithium charge carriers advantageously has a low self discharge of less than 10% per year, even when the mismatched battery 20 is composed of mismatched battery cells 22. Thus a multi-cell lithium battery 20 with battery cells 22a,b having mismatched internal resistances and low self-discharge rates is capable of providing both excellent pulse-mode capabilities together with extended operational time.

Figure 5:
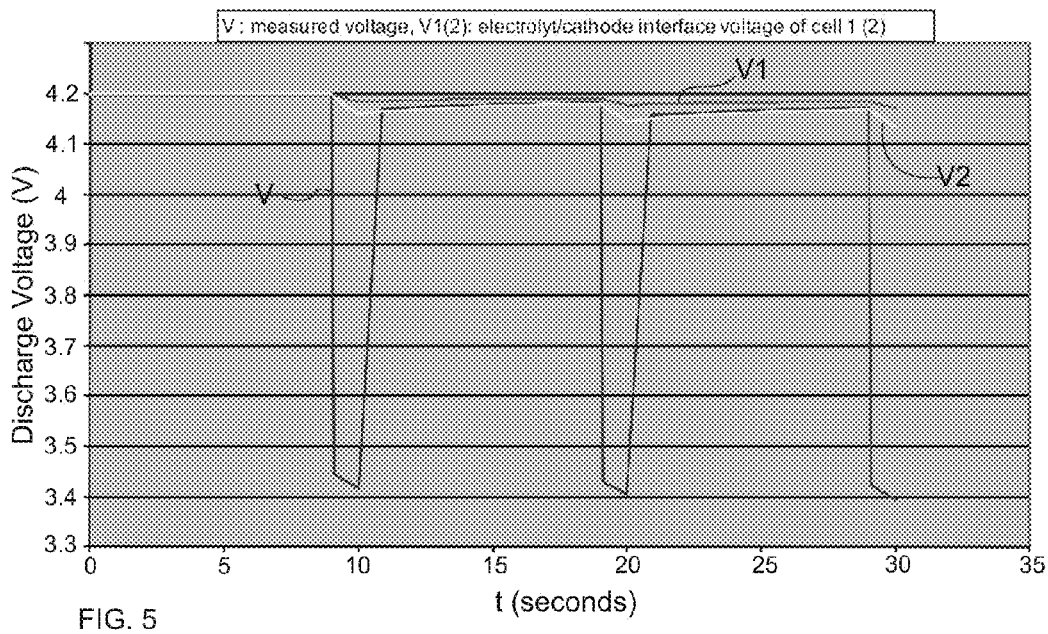
FIG. 5 is a graph of a simulation of the discharge voltage of a battery over time, the battery comprising first and second battery cells having different internal resistances and being operated in a pulse mode, where the stimulated discharge voltage is the voltage V1 and V2 at the cathode/electrolyte interface of each of the first and second battery cells, respectively.

The pulse-mode capability of a multi-cell mismatched battery 20 is demonstrated in a simulation model as shown in FIG. 5. The simulation shows the discharge voltage of the two battery cells 22a,b of the mismatched battery 20 over a pulse duty cycle in which the battery 20 powers a stimulated pulse mode device 74. In this model, each battery cell 22a,b is assumed to have an active area 122 of 1 $cm^2$, a cathode with a thickness of 15 microns, and a charge capacity of 0.828 mAh. The first battery cell 22a producing the voltage $V_1$ has an electrolyte 44 with a thickness of 3 microns resulting in an internal resistance of $R_1$ of 300 ohm and charge capacity of 0.828 mAh; whereas, the second battery cell 22b producing the voltage $V_2$ has an electrolyte 44 with a thickness of 1 microns 3 providing an internal resistance $R_2$ of 100 ohm and charge capacity of 0.828 mAh. The net or total internal resistance R of the resultant mismatched battery 20 is 75 ohm and the net or total charge capacity of the battery 20 is 1.656 mAh.

In FIG. 5, the voltage of the battery is shown by the line labeled V, the discharge voltage of the first battery cell 22a is shown by the line labeled $V_1$, and the discharge voltage of the second battery cell 22b is shown by the line labeled $V_2$. $V_1$ and $V_2$ are both related to the voltage at the electrolyte/cathode interface of the cells 22a,b and cannot be measured directly. However $V_1$ and $V_2$ can be calculated from the formula:

$$V=V_1-I_1*R_1=V_2-I_2*R_2 \text{ and } I=I_1+I_2.$$

in which (I) is the discharge current, (V) is the measured output voltage, and (R) is a resistance of each of the battery cells 22a,b. The discharge voltage $V_1$ and $V_2$ of each battery cell 22a,b, respectively, can be determined from the measured discharge current using ampere meters which are electrically connected in series with the first and second battery cells 22a and 22b, respectively, to measure the $I_1$ of the first battery cell 22a and $I_2$ of the second battery cell 22b. After a time period of 9 seconds, the battery cells 22a,b were disconnected from an external electric load for the power-off time period, to measure low discharge current of 0.01 mA and a drop of V, $V_1$ and $V_2$ which was minimal. The battery cells 22a,b were connected to the external electrical load for a power-on time period of from 9 to 10 seconds. The second battery cell 22b had a lower internal resistance, and thus, generated a higher discharge current and large voltage drop due to the finite lithium diffusion rate across the cathode 42, as compared to the higher internal resistance first battery cell 22a. The output voltage (V) exhibited a big voltage drop corresponding to (I*R) when comparing the measured values of $V_1$ and $V_2$, for the first and second battery cells 22a,b, respectively. In the files-off time period when the external load was disconnected from the battery 20, $V_1$ and $V_2$ recovered slowly due to the redistribution of the charge carrying lithium species at the interface of the cathode 42 and electrolyte 44. Thus during the power-off time period the first battery cell 22a began recharging the second battery cell 22b causing $V_e$ to recover substantially faster than $V_1$ and experience a slightly voltage drop at end of the power-off time period.

Still further, a mismatched battery 20 having thinner second battery cells 22b is particularly suitable for pulse mode operation in which a high current is provided during a periodic duty cycle or even though the charge capacity of the thinner second battery cell 22b is smaller, as a high current output is more critical in these applications than the total battery capacity. Combining the thinner second battery with thicker first battery cells 22a having thicker cathodes 42 and thicker electrolytes 44, as the thicker first battery cells 22a provide the charge capacity needed was the mismatched battery 20 is better suited for high current applications. For example, in such batteries, the concentration effective distance (L) can be estimated from the formula: $L^2 \sim D*t$, where D is the lithium diffusion coefficient in a cathode 42, (about 1E-9 $cm^2/s$ in cathode 42 comprising LiPON) and t is the discharge (charge) time. Assuming a pulse mode operation which the power-on time period has a duration of 1 second (which applies to many pulse mode applications), the value of L is only around 0.3 microns. Therefore, the voltage profile (V, $V_1$, and $V_2$) of a mismatched battery 20 comprising the first and second battery cells 22a,b remain almost unchanged in a battery 20 in which the first battery cells 22a have a cathode thickness of 15 microns and the second battery cells 22b have a cathode thickness of 5 microns or even 1-2 microns. In pulse mode operations, the lithium concentration is only altered near interface of the cathode 42 and overlying electrolyte 44, thus, the voltage profile of the entire battery 20 does not change significantly.

The mismatched battery 20 is also suitable for low recharging applications in which the battery is not frequently recharged. In low recharging applications, the mismatched battery 20 is recharged once a week, once a month, or even higher. Again, the mismatched battery 20 provides better performance and recharging applications because of the ability of the high internal resistance, high charge capacity, first cells 22a to recharge the low internal resistance, low charge capacity cells 22b during the time periods in the battery is not being used. Further, solid-state lithium batteries 20 having low self discharge rates which reduce the loss of battery charge during storage periods. Thus a multi-cell mismatched battery 20 with battery cells 22 having different internal resistances and low self-discharge rates is capable of providing extended operational time without frequent recharging.

An exemplary process of fabricating one or more battery cells 22a,b of a battery 20 on a top surface 26 and/or bottom surface 27 of a support 24 is illustrated with reference to FIGS. 6 and 7. While exemplary process embodiments for fabricating a set of mismatched battery cells 22a,b of a battery 20 are described, it should be understood that other fabrication processes as would be apparent to one of ordinary skill in the art are within the scope of the present invention. For example, the fabrication process described herein can include processes of forming battery cells 22a,b which are found in, for example, commonly assigned U.S. patent application Ser. No. 12/032,997, entitled "SOLID-STATE BATTERY FABRICATION USING LASER SHAPING" to Nieh et al., filed on Feb. 18, 2008; U.S. Pat. No. 6,921,464; U.S. Pat. No. 6,632,563, U.S. Pat. No. 6,863,699, and U.S. Pat. No. 7,186,479; all of which are incorporated by reference herein and in their entireties.

Figure 6:
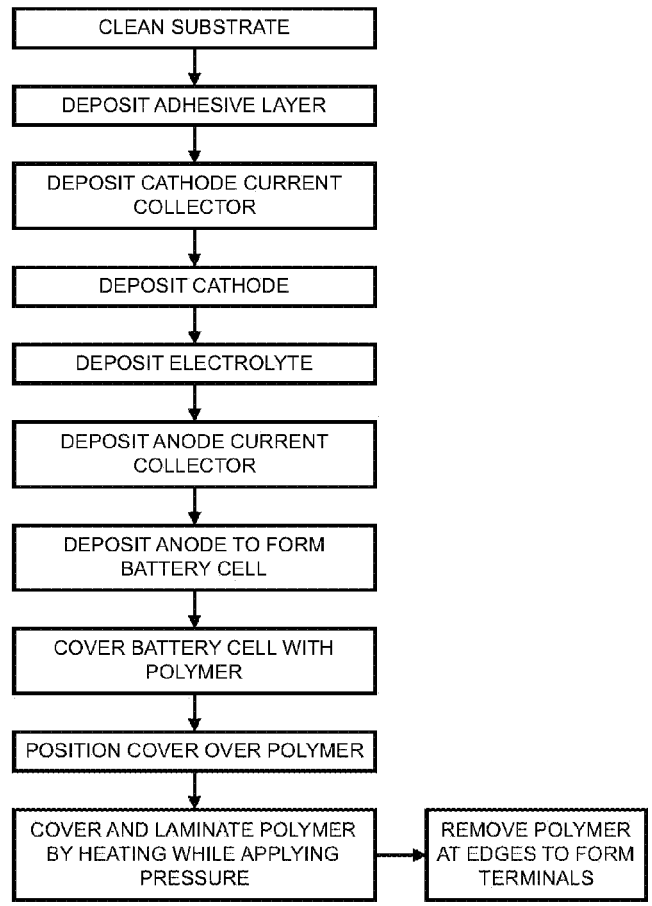
FIG. 6 is a flowchart of an exemplary process for fabricating battery cells on a support.

Referring to the flowchart FIG. 6, in the fabrication process, one or more supports 24 are selected. For example, the support 24 can comprise a plate or box of material having low permeability to oxygen, water vapor, carbon monoxide, carbon dioxide and the like. Each of the supports 24 should have a relatively smooth surface and sufficient strength to support battery cells 22 at conventional fabrication or operational temperatures. For example, the support 24 can comprise aluminum, aluminum oxide, metal foil, metalized plastic film, mica, quartz, or steel. In one version, a support 24 comprises a plate having a first surface 26 and a second surface 27, both of which are planar, or even flat and smooth. One exemplary support 24 comprises a crystalline sheet formed by cleaving the planes of a cleavable crystalline structure, such as mica or graphite. However, the support 24 can also be a box, such as an open container shape, for containing the battery cells therebetween, such as a plastic container.

The top and bottom surfaces 26, 27 of the selected support(s) 24 are cleaned to remove surface contaminants to obtain good adherence of subsequently deposited layers. For example, the support 24 can be cleaned by an annealing process in which the support 24 is heated to temperatures sufficiently high to clean the surface by burning-off contaminants and impurities, such as organic materials, water, dust, and other materials deposited on the surfaces 26, 27.

The support 24 can also be heated to temperatures sufficiently high to remove any water of crystallization present in the support material. The annealing temperatures and/or water of crystallization removal temperatures can be, for example, from about 150 to about 600° C., or even at least about 540° C. The annealing process can be conducted in an oxygen-containing gas, such as oxygen or air, or other gas environments, for about 10 to about 120 minutes, for example, about 60 minutes.

After a suitably clean surface is obtained, the battery component layers 30a,b of one or more battery cells 22a,b are deposited on one or more supports 24 using a plurality of different processes. The battery component layers 30a,b contain one or more lithium-containing layers 31a,b composed of elemental lithium or lithium compounds. In a minimal configuration, each of the battery cells 22a,b comprises an electrolyte 44a,b that is sandwiched between at least about a pair of electrodes that include (i) a cathode current collector 38a,b, cathode 42a,b, or cathode contact pad (not shown), and (ii) an anode 48a,b, anode contact pad 50a,b or anode current collector (not shown), respectively.

The exemplary fabrication processes are described for a single battery cell 22 with process modifications described for achieving a thicker or thinner cathode 42 and electrolyte 44, to avoid repetition. For example, when mismatched battery cells 22a,b are used in a mismatched battery 20, fabrication processes having different process parameters can be repeated to form one or more battery cells 22a on a top surface 26 and one or more battery cells 22b on the bottom surface 27 of a single support 24, or the battery cells 22a,b can be formed on different supports 24 and subsequently electrically connected with wire bonding or other bonding methods. Still further, for a battery 20 comprising a battery cell 22 electrically connected to a capacitor 61, or a plurality of battery cells 22 which are not mismatched, can also be formed on a support 24. Also, it should be noted that before or after fabrication of any of the battery component layers 30 of a battery cell 22a, the battery component layers 30 can be shaped to form shaped features by removing portions of the battery component layers 30 or the support 24. The shaping processes can be performed, for example, after deposition of a cathode 42 and electrolyte 44 to shape one or both of these films, such as by etching away the edge portions or forming holes for the terminals 25a,b. Suitable shaping processes include pulsed laser, etching, and other such processes, and these processes can be used to form the shapes of the battery component layers 30a,b shown in FIGS. 1A and 1B.

Referring back to FIG. 6, optionally, an adhesion layer 34 is deposited to cover most of on the top and/or bottom surfaces 26, 27 of the support 24, to improve adhesion of particular overlying battery component layers 30. When used, the adhesion layer 34 can comprise a metal or metal compound, such as for example, aluminum, cobalt, titanium, other metals, or their alloys or compounds thereof; or a ceramic oxide such as, for example, lithium cobalt oxide. When the adhesion layer 34 is fabricated from titanium, the titanium layer is deposited in a sputtering chamber 100 of a sputtering apparatus 90 as shown in FIG. 7, with for example, the process conditions: argon flow to maintain a pressure of 2 mTorr; DC (direct current) sputtering plasma with a plasma current power level applied to the sputtering target 62 set at a power level of 1 kW, deposition time of 30 seconds, and using a sputtering target 62 composed of titanium at a distance of 10 cm from a support 24.

A cathode current collector 38 for collecting electrons during charging and discharging processes is formed directly on the support 24 or on portions of the adhesion layer 34. A suitable thickness for the current collector 38 is from about 0.05 microns to about 2 microns. In one version, the current collector 38 comprises platinum in a thickness of about 0.2 microns. The current collector 38 can be formed by deposition of platinum by DC magnetron sputtering in the sputtering chamber 100. For example, the sputtering conditions for depositing a cathode current collector 38 from a platinum target uses sputtering gas comprising argon at a gas pressure of 5 mTorr in a DC plasma at a power level of 40 W for 10 minutes. A cathode contact pad (not shown) can also optionally be formed to overlay or underlie the cathode current collector 38 and to connect to the terminal 25a.

In the exemplary version shown, an anode contact pad 50 (which as shown is also known as an anode contact pad) is also deposited on the adhesion layer 34. such that an outside extending portion of the anode contact pad 50 serve as a terminal 25b of the battery cell 22. The anode contact pad 50 can be made of the same material as the cathode current collector 38 to provide a conducting surface from which electrons may be dissipated or collected from the anode 48. For example, the anode contact pad 50 can be composed of platinum. The anode contact pad 50 typically has a thickness of from about 0.05 microns to about 5 microns. In one version, the anode contact pad 50 comprises platinum and is deposited in the same deposition process as the cathode current collector 38, but to cover another portion of the adhesion layer 34 that is separated by a small gap from the portion of the adhesion layer 34 that lies below the cathode current collector 38.

Still further, the anode contact pad 50 can also comprise more than one layer, for example a layer of copper deposited over a layer of platinum. This version is useful when the anode 48 (which touches and electrically contacts the anode contact pad 50) is composed of a material such as lithium which would otherwise react with platinum. The layer of copper is deposited over a small portion of the platinum layer to prevent undesirable reactions between the lithium anode and the platinum anode contact pad. A suitable sputtering process for sputtering copper comprises DC magnetron sputtering in the sputtering chamber 100 from a copper target using a sputtering gas comprising argon, at a gas pressure of from about 1 mTorr to about 100 mTorr, in a DC plasma at a power level of from about 50 to about 5000 W for from about 5 to about 20 minutes to deposit a copper layer having a thickness of from about 0.1 to 5 microns, or even about 0.2 microns.

A cathode 42 is then deposited on at least a portion of the cathode current collector 38. In one version, the cathode 42 is composed of lithium metal oxide, such as for example, lithium cobalt oxide, lithium nickel oxide, lithium manganese oxide, lithium iron oxide, or even lithium oxides comprising a mixture of transition metals such as for example, lithium cobalt nickel oxide lithium-containing transition metal oxides such as $LiCoO_2$, $LiNiO_2$, $LiMn_2O_4$, $LiMnO_2$, $LiCo_{0.5}Ni_{0.5}O_2$ and $LiNiO_{0.7}Co_{0.2}Mn_{0.1}O_2$ and lithium-free metal oxides such as $MnO_2$. Other types of cathodes 42 that may be used comprise amorphous vanadium pentoxide, crystalline $V_2O_5$ or $TiS_2$. For example, a cathode 42 comprising $LiCoO_2$, which is sputtered in a sputtering chamber 100 supplied with a sputtering gas comprising argon and oxygen in a flow rate of from about 100 sccm to about 500 sccm, a gas pressure of from about 5 mTorr to about 15 mTorr, and a plasma formed by applying a power level of from about 2 KW to about 5 KW to the magnetron 78. After deposition of the cathode 42, an annealing step can be performed at temperatures of from about 300° C. to about 600° C. The annealing process can be conducted directly in the sputtering chamber 100 or in a separate annealing chamber.

A thick or thin cathode 42 can be deposited to form the first or second battery cells 22a,b, depending on the selected structure of the mismatched battery 20, by varying the deposition time of the cathode deposition process. For example, a thick cathode 42 having a thickness of at least about 10 microns can be deposited using the above-described sputtering conditions in a sputtering process conducted for at least about 300 minutes. Conversely, a thin cathode 42 having a thickness of less than about 5 microns can be deposited using the above-described sputtering conditions in a sputtering process conducted for less about 60 minutes.

After deposition of the cathode 42 in the desired thickness, an electrolyte 44 comprising a lithium-containing material is formed on the cathode 42. The electrolyte 44 can be, for example, an amorphous lithium phosphorus oxynitride film, also known as a LiPON film. In one embodiment, the LiPON has the stoichiometric form $Li_xPO_yN_z$ in an x:y:z ratio of about 2.9:3.3:0.46. Again, the thickness of the electrolyte 44 can be controlled to form a thick or a thin electrolyte by varying the process time of the sputtering process. A suitable sputtering process uses a sputtering target composed of $Li_3PO_4$, a sputtering gas comprising nitrogen at a flow rate of from about 50 sccm to about 500 sccm, a pressure of from about 1 mTorr to about 20 mTorr, and a plasma formed by applying a RF current to the magnetron 78 at a power level of from about 0.5 KW to about 5 KW. A thick electrode 44 having a thickness of at least about 3 microns can be deposited using the above-described sputtering conditions in a sputtering process conducted for at least about 100 minutes. Conversely, a thin electrolyte 44 having a thickness of less than about 2 microns can be deposited using the above-described sputtering conditions in a sputtering process conducted for less about 60 minutes.

An anode 48 is formed on the electrolyte 44 to receive electrons released by lithium ions that migrate through the electrolyte 44. The anode 48 can be a lithium-containing material which can be elemental lithium or a lithium compound, or a conducting metal such as copper. In one version, the anode 48 is made from elemental lithium. The elemental lithium is also sufficiently conductive to serve as an anode current collector, so the anode contact pad 50 is sufficient to conduct electrons to and from the anode. The anode 48 can also be composed of the same material as the cathode 42. A suitable thickness of the anode 48 is from about 0.1 microns to about 20 microns. The anode 48 can also be permeable as for example described in U.S. Pat. No. 6,713,987, entitled "Rechargeable battery having permeable anode current collector", filed on Feb. 28, 2002, which is incorporated herein by reference in its entirety. The anode 48 can extend to cover the entire area of the cathode 42 or terminate short of the cathode area to provide reduced electrical shorting at the anode edges.

When an anode current collector is used (not shown), the anode current collector is deposited to cover the active area of the anode 48, and with a portion extending beyond the anode 48 to serve as the terminal 25b of the battery cell 22. The anode current collector can be made of the same material as the cathode current collector 38 to provide a conducting surface from which electrons may be dissipated or collected from the anode 48. For example, the anode current collector can be composed of platinum and deposited as previously described for the cathode current collector 38. The anode current collector typically has a thickness of from about 0.05 microns to about 5 microns.

In the embodiment of the mismatched battery 20 of FIG. 10, the at least one battery cell 22 is fabricated on the support 24 as described above. Before or after fabrication of the battery cell 22, a capacitor 61 is formed on the first surface 26 (not shown), or the second surface 27 (as shown), of the support 24. In one version, a battery cell 22 is formed on the first surface 26 of the support 24. The second surface 27 of the support 24 is then cleaned, an optionally, an adhesion layer 34 is deposited on the surface 27 as described above. A first electrode 68a is then deposited on the adhesion layer 34. For example, a first electrode 68a comprising copper can be deposited by conventional sputtering processes using a sputtering target composed of copper provided in the sputtering chamber 100; using a sputtering gas comprising argon maintained at a pressure of from about 1 mTorr to about 20 mTorr; a plasma power level of from about 200 W to about 2 KW; and a deposition time of from about 5 to about 60 minutes. Thereafter, the dielectric 51 is formed on the first electrode 68a by forming a layer of $BaTiO_3$ by sputtering a sputtering target composed of $BaTiO_3$ provided in the sputtering chamber 100; using a sputtering gas comprising argon maintained at a pressure of from about 1 to about 100 mTorr; a RF plasma power level of from about 200 W to about 2 KW; and deposition time of from about 10 to about 120 minutes. The dielectric 66 can also be a polymer film. Thereafter, the second electrode 68b is deposited on the dielectric 66 using the same sputtering process as that used for depositing the first electrode 68a. While a single capacitor 61 is shown, it should be understood that a plurality of capacitors 61 can also be used, each of which can each have the same capacitance or different capacitances.

After fabrication of one or more battery cells 22a,b and/or capacitors 61 on a support 24, a casing 21 is fabricated to protect the battery cells 22a,b and/or capacitors 61 from degradation in the external environment. In one version, the casing 21 comprises a polymer 52, which can be the same polymer as the polymer described above or a different polymer, and generally comprises a conformal material which can fill out the gaps and uneven heights of the profile of the battery cells 22a,b to provide a flatter profile. The polymer 52 is applied in liquid or film form, to cover a top surface 58 and/or extend across the side perimeter surfaces 54 of the battery cells 22a,b or a capacitor 61, and even extending to cover the perimeter 56 of the battery 20.

Thereafter, one or more covers 60 or 60a,b which form another portion of the casing 21, is positioned on top of, or spaced apart from, the polymer 52 to cover the battery cells 22 and/or capacitors 61. In one version, the cover 60 is a rigid plate of a ceramic material, a metal foil, or a metal coated plastic film, or a plurality of ceramic and polymer films which are conformal to the shape of the battery. Suitable ceramic tools include aluminum oxide or diamond-like carbon (DLC), and a suitable composition of the polymer comprises polymer, epoxy, or even a thermoset or thermoplastic polymer. The cover 60 can also be made from the same material as the support 24. The cover 60 can have a thickness of less than about 50 microns, for example, from about 7 to about 40 microns.

After placement, the cover 60 or covers 60a,b can be laminated to the underlying battery cells 22a,b and/or the support 24, by applying a pressure to press the cover 60 or both covers 60a,b, against the support 24. The pressure can squeeze out the polymer 52 therebetween. A suitable pressure may be 3 psi, or even from about 3 to about 60 psi, for example, about 10 psi. The laminating process can be conducted in air or in a non-reactive gas environment, such as argon or nitrogen. A vacuum can also be pulled on the partially fabricated battery 20 using a vacuum pump to remove trapped air and form a better laminate of the cover 60, polymer 52 and underlying support 24. A suitable vacuum comprises a pressure of from about 10 mTorr to about 10 Torr. While the pressure is being applied, the battery cell 22 can also be heated to cure or to soften the polymer 52, a suitable curing or softening temperature being at least about 40° C., or even from about 50 to about 110° C. After curing of polymer 52, the edge portions of the polymer 52 overlying the sections of the cathode current collector 38a,b and anode contact pad 50a,b that extend beyond the peripheral edge of the battery 20 (see FIGS. 1A and 1B) are peeled off to expose underlying material that serves as the first and second terminals 25a,b, respectively.

One or more of the fabricated battery cells 22a,b, capacitors 61, or completed batteries 20 can be cut out of a support 24 on which a plurality of batteries 20 or battery cells 22a,b are fabricated. A suitable battery cutting process can include laser or mechanical cutting. Laser cutting can be performed using a pulsed laser process. In one exemplary embodiment, the laser source is a femtosecond laser comprising a diode-pumped solid-state laser with a lasing medium comprising a rod of titanium doped sapphire. In another exemplary embodiment, the pulsed laser source is an ultraviolet laser such as an excimer or 'excited dimer' laser, which is a chemical laser that uses a combination of an inert gas, such as argon, krypton, or xenon; and a reactive gas such as fluorine or chlorine, to generate a laser beam. Other laser sources can also be used, as would be apparent to one of ordinary skill. Several exemplary laser source and cutting methods are described in co-pending U.S. patent application Ser. No. 11/796,487 to Li et al. and co-pending U.S. patent application Ser. No. 12/032,997 to Nieh et al., both of which are incorporated by reference herein and in their entireties.

Figure 7:
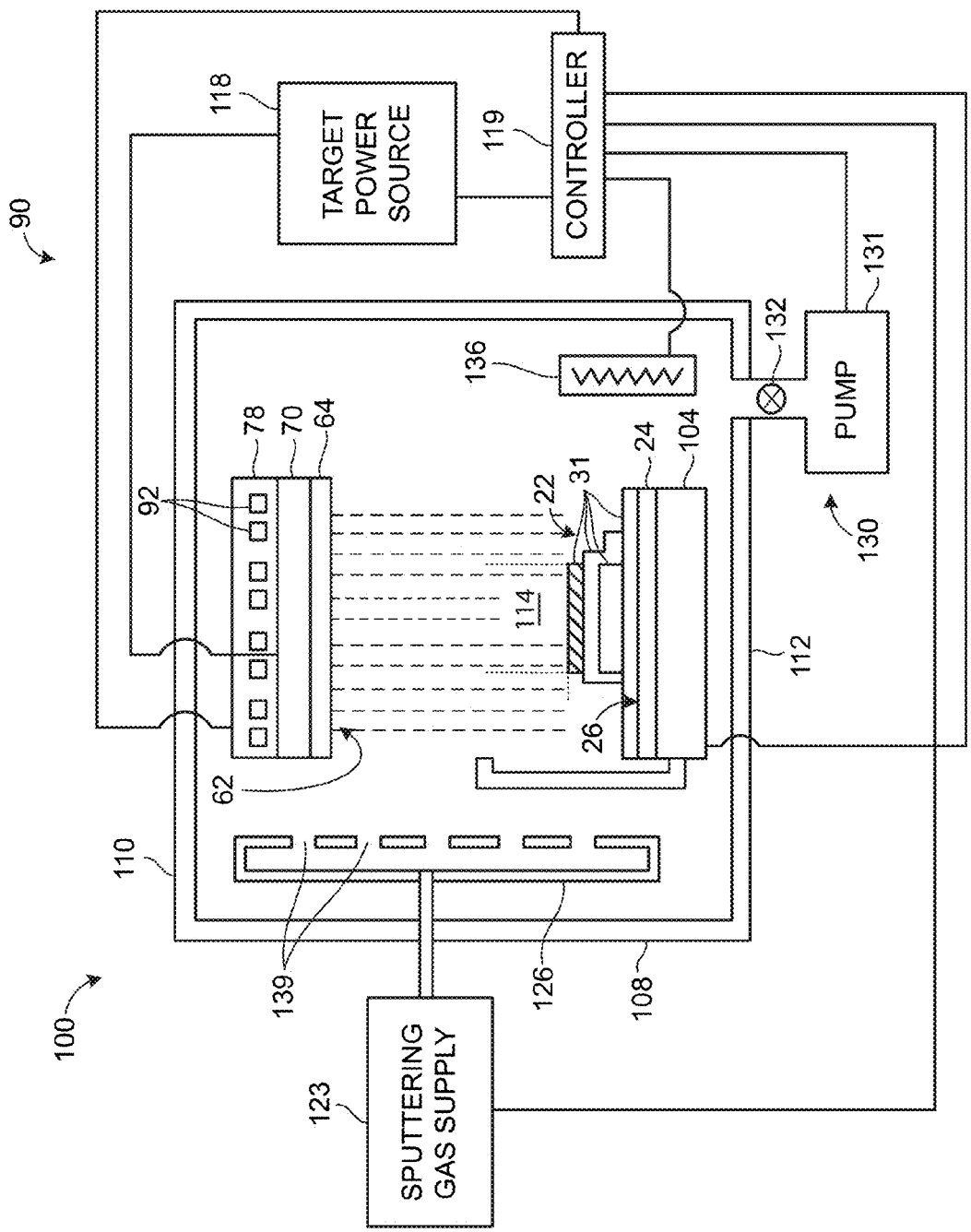
FIG. 7 is a sectional side schematic view of a sputtering chamber capable of depositing at least the electrolyte and cathode of the first and second battery cells.

The battery component layers 30a,b of each of the battery cells 22a,b including the adhesion layers 34a,b, cathode current collector 38a,b, cathode 42a,b, electrolyte 44a,b, anode 48a,b, and anode contact pad 50a,b, can be sputter deposited onto a battery support 24 by sputtering one or more sputtering targets 62 mounted in a sputtering chamber 100 of a sputtering apparatus 90, as shown in FIG. 7. The sputtering chamber 100 comprises a sidewall 108, upper wall 110 which may be a ceiling, and lower wall 112, all of which surrounds and encloses a sputtering zone 114. The chamber sidewall 108 can be electrically isolated from the upper wall 110 and the lower wall 112 and can be electrically grounded. Sputtering gas is introduced into the chamber via gas holes 139 of a gas distributor 126, which is connected to a sputtering gas supply 123 which can include compressed gas cylinders, flow meters, valves, and other flow control equipment. The sputtering gas can contain non-reacting gases that can be energized to form a plasma that ionizes and sputters material from the sputtering targets 62, and/or can also contain reactive gases that react with sputtered material from a sputtering target 62 to form compounds that deposit on the support 24. The chamber 100 can be evacuated to a preset pressure and the process or sputtering gas provided in the chamber 100 maintained at a predefined pressure, by a gas exhaust 130 comprising one or more vacuum pumps 131 and a throttle valve 132. The chamber 100 can also include a resistance heater 136 to heat the sputtering zone 114.

A sputtering target 62 comprising a backing support 70 supporting a sputtering member 64 is fastened in the sputtering chamber 100 to oppose and face a support carrier 104. The sputtering target 62 is positioned abutting a magnetron 78, which generates a magnetic field about the surface of the sputtering target 62 to provide a more uniform and continuous bombardment of the target 62 with sputtering plasma ions during the sputtering process. The magnetron 78 contains one or more magnets 92, and can be internally mounted inside the chamber 100 or externally mounted. A target power source 118 comprising one or more power supplies provides an AC voltage at a voltage level of from about 200V and about 1200V, or even from about 250V to about 450V. The voltage can be provided at a power level of from about 1 kW and about 20 kW, or even from about 3 KW to about 10 KW. The voltage can also be provided at a mid-frequency level of from about 10 to about 100 kHz, or even at a frequency of from about 20 kHz to about 80 kHz.

The sputtering member 64 is composed of one or more of the elements to be sputtered onto the support 24, and can be rectangular, circular or cylindrical in shape, depending on the shape or configuration of the chamber 100 or battery support 24. For example, the sputtering member 64 can be composed of a lithium compound, such as lithium, lithium oxide, lithium cobalt oxide, or other lithium compounds. The lithium-containing material is selected to obtain the desired composition of a lithium-containing film 31. For example, a cathode 42 of a battery cell 22 can deposited using a sputtering member 64 composed of lithium cobalt oxide having the stochiometric formula $LiCoO_2$. As another example, an electrolyte 44 of a battery cell 22 can deposited using a sputtering member 64 composed of lithium, lithium oxide or lithium phosphate. As still another example, an anode 48 of a battery cell 22 can be deposited using a sputtering member 64 composed of lithium. In still another example, the sputtering member 64 can be composed of copper or platinum, or other elemental metals, suitable for forming anode or cathode current collectors and contact pads.

A support carrier 104 is transported into the sputtering chamber 100 and positioned facing the sputtering target 62 inside the chamber 100. The support carrier 104 is capable of holding one or more supports 24 so that at least about one surface 26 of a single or plurality of supports 24, or both surfaces 26, 27 of one or more supports 24, are exposed to the sputtering zone 114. For example, the support carrier 104 can be a rotating carousel or mechanical conveyor. The support carrier 104 is typically fabricated from plates of a metal such as copper or stainless steel.

In a sputtering process, the sputtering chamber 100 is controlled by a controller 119 that comprises program code to operate and control the various components of the chamber 100 to deposit the battery component layers 30 on a plurality of battery supports 24 in the chamber 100. The controller 119 comprises, for example, a general purpose computer or control electronic box, which has program code to control the gas supply 123, gas distributor 126, exhaust 130 and throttle valve 132, target power source 118 to apply a power to the sputtering target 62 or magnetron 78, and other chamber components. For example, the chamber 100 can be evacuated to a preset pressure by the gas exhaust 130 to a pressure of less than about $10 \times 10^{-5}$ Torr, prior to introduction of any cleaning or sputtering gas. Thereafter, controlled amounts of cleaning or sputtering gas are introduced into the chamber 100 via the gas distributor 126. When the plasma is formed from the sputtering gas, the sputtering gas sputters the sputtering member 64 of the sputtering target 62 depositing the material of the sputtering member onto the substrate 24. The sputtered material can also react with reactive components of the sputtering gas is introduced into the chamber 100. For example, the sputtering process can include oxygen or nitrogen which react with sputtered metal species to form a metal oxide or metal nitride compound. Between sputtering processes, the interior of the chamber 100 can be cleaned by introducing a cleaning gas of, for example, argon, into the chamber 100 and forming a cleaning plasma to clean residues from the interior surfaces of the chamber 100.

While illustrative embodiments of the battery 20 are described in the present application, it should be understood that other embodiments are also possible. The exemplary anode and battery cell structures described herein are provided only to illustrate the present invention, and other structures can be used as would be apparent to those of ordinary skill in the art. Furthermore, the battery components layers 30*a,b* and fabrication processes are also exemplary and may comprise other materials. Also, each battery 20 may contain a plurality of each of the first and second battery cells 22*a,b* connected in series or parallel and arranged depending on the application. Thus the scope of the claims should not be limited by the exemplary methods of manufacture, materials and structures provided herein.

What is claimed is:

1. A pulse mode apparatus comprising:
    (a) a mismatched battery comprising:
        (i) a first battery cell having a first electrolyte with a first internal resistance and first charge capacity and a second battery cell having a second electrolyte with a second internal resistance and second charge capacity, and comprising both of the following: (1) the second internal resistance is less than the first internal resistance such that a ratio of the first internal resistance to the second internal resistance is at least 3:2, and (2) the second charge capacity is less than the first charge capacity;
        (ii) a pair of electrical connectors electrically coupling the first and second battery cells in parallel;
        (iii) a pair of terminals electrically connected to the first or second battery cells; and
        (iv) a casing around the first and second battery cells such that the terminals extend out of the casing; and
    (b) a pulse mode device electrically connected to the terminals of the mismatched battery, the pulse mode device having a pulse duty cycle with a power-on time period and a power-off time period.

2. An apparatus according to claim 1 wherein the second internal resistance is sufficiently lower than the first internal resistance that the second battery cell is capable of providing electrical power to the pulse mode device for substantially the entire power-on time period, and the first battery cell is capable of substantially recharging the second battery cell during the power-off time period.

3. An apparatus according to claim 1 wherein the second battery cell provides electrical power to the pulse mode device for at least 80% of the power-on time period.

4. An apparatus according to claim 1 wherein the second battery cell provides electrical power to the pulse mode device for a power-on time period of from about 10 milliseconds to about 1 second, and the first battery cell recharges the second battery cell during a power-off time period of from about 100 milliseconds to about 100 seconds.

5. An apparatus according to claim 1 wherein the second internal resistance is lower than the first internal resistance by at least 30%.

6. An apparatus according to claim 1 wherein the second internal resistance is from about 50Ω to about 100Ω and the first internal resistance is from about 150Ω to about 200Ω.

7. An apparatus according to claim 1 comprising at least one of the following:
    (1) a first internal resistance of at least about 150Ω and a second internal resistance of less than about 100 Ω;
    (2) the first battery cell has a first internal resistance per unit active area and the second battery cell has a second internal resistance per unit active area, and wherein the ratio of the first internal resistance per unit active area to the second internal resistance per unit active area is at least 3:2; and
    (3) the first battery cell comprises a first maximum current density and the second battery cell comprises a second maximum current density, the second maximum current density being larger than the first maximum current density.

8. An apparatus according to claim 1 comprising at least one of the following:
    (1) the ratio of the first charge capacity to the second charge capacity is at least about 2:1;
    (2) the first charge capacity is at least about 1 mAh; and
    (3) the second charge capacity is less than about 0.5 mAh.

9. A pulse mode apparatus comprising:
    (a) a mismatched battery comprising:
        (i) a first battery cell having a first electrolyte with a first internal resistance and a second battery cell having a second electrolyte with a second internal resistance, the second internal resistance being less than the first internal resistance such that a ratio of the first internal resistance to the second internal resistance is at least 3:2;
        (ii) a pair of electrical connectors electrically coupling the first and second battery cells in parallel;
        (iii) a pair of terminals electrically connected to the first or second battery cells; and
        (iv) a casing around the first and second battery cells such that the terminals extend out of the casing; and
    (b) a pulse mode device electrically connected to the terminals of the mismatched battery, the pulse mode device having a pulse duty cycle with a power-on time period and a power-off time period.

10. An apparatus according to claim 9 wherein the second internal resistance is lower than the first internal resistance by at least 30%.

11. An apparatus according to claim 9 wherein the second internal resistance is sufficiently lower than the first internal resistance that the second battery cell is capable of providing electrical power to the pulse mode device for substantially the entire power-on time period, and the first battery cell is capable of substantially recharging the second battery cell during the power-off time period.

12. An apparatus according to claim 9 comprising at least one of the following:
    (1) the second battery cell provides electrical power to the pulse mode device for at least 80% of the power-on time period;
    (2) the second battery cell provides electrical power to the pulse mode device for a power-on time period of from about 10 milliseconds to about 1 second; and
    (3) the first battery cell recharges the second battery cell during a power-off time period of from about 100 milliseconds to about 100 seconds.

13. An apparatus according to claim 9 wherein the second internal resistance is from about 50Ω to about 100Ω and the first internal resistance is from about 150Ω to about 200Ω.

14. An apparatus according to claim 9 comprising at least one of the following:

(1) a first internal resistance of at least about 150Ω and a second internal resistance of less than about 100Ω;
(2) the first battery cell has a first internal resistance per unit active area and the second battery cell has a second internal resistance per unit active area, and wherein the ratio of the first internal resistance per unit active area to the second internal resistance per unit active area is at least 3:2; and
(3) the first battery cell comprises a first maximum current density and the second battery cell comprises a second maximum current density, the second maximum current density being larger than the first maximum current density.

15. An apparatus according to claim 9 wherein the first battery cell further comprises a first charge capacity and the second battery cell further comprises a second charge capacity, the second charge capacity being less than the first charge capacity.

16. An apparatus according to claim 15 wherein the ratio of the first charge capacity to the second charge capacity is at least about 2:1.

17. An apparatus according to claim 15 comprising at least one of the following:
(1) the first charge capacity is at least about 1 mAh; and
(2) the second charge capacity is less than about 0.5 mAh.

18. An apparatus according to claim 9 wherein the first and second battery cells each comprise at least one of: (i) lithium battery cells, and (ii) battery component layers having a thickness of less than about 100 microns.

19. An apparatus according to claim 9 wherein the first battery cell comprises a first electrolyte thickness and a first cathode thickness, and wherein the second battery cell comprises a second electrolyte thickness and a second cathode thickness, and wherein the second electrolyte thickness is less than the first electrolyte thickness and the second cathode thickness is less than the first cathode thickness.

20. An apparatus according to claim 19 comprising at least one of the following:
(i) the second electrolyte thickness is less than the first electrolyte thickness by at least about 20%;
(ii) the first electrolyte thickness is at least about 3 microns; and
(iii) the first cathode thickness is at least about 15 microns.

* * * * *